(12) United States Patent
Sanders et al.

(10) Patent No.: US 6,304,585 B1
(45) Date of Patent: Oct. 16, 2001

(54) FREQUENCY CONVERSION SYSTEM

(75) Inventors: Steven Sanders, Mountain View; Robert J. Lang, Pleasanton, both of CA (US)

(73) Assignee: SDL, Inc., San Jose, CA (US)

( * ) Notice: Subject to any disclaimer, the term of this patent is extended or adjusted under 35 U.S.C. 154(b) by 0 days.

(21) Appl. No.: 09/734,862

(22) Filed: Dec. 11, 2000

Related U.S. Application Data

(62) Division of application No. 09/123,387, filed on Jul. 27, 1998, which is a division of application No. 08/649,560, filed on May 17, 1996, now Pat. No. 5,912,910.

(51) Int. Cl.$^7$ .................................................... H01S 3/10
(52) U.S. Cl. .............................. 372/22; 372/21; 359/326
(58) Field of Search ................................. 372/22, 21, 37; 359/326

(56) References Cited

U.S. PATENT DOCUMENTS

| | | | |
|---|---|---|---|
| 5,007,705 | 4/1991 | Morey et al. | 350/96.29 |
| 5,058,977 | 10/1991 | Sorin | 385/30 |
| 5,159,601 | 10/1992 | Huber | 372/6 |
| 5,321,718 | 6/1994 | Waarts et al. | 372/108 |
| 5,323,404 | 6/1994 | Grubb | 372/6 |
| 5,392,308 | 2/1995 | Welch et al. | 372/92 |
| 5,446,809 | 8/1995 | Fritz et al. | 385/17 |
| 5,469,520 | 11/1995 | Morey et al. | 385/37 |
| 5,912,910 | * 1/1999 | Sanders et al. | 372/22 |

OTHER PUBLICATIONS

Simon, et al., "Difference–frequency generation in AgGaS$_2$ by use of single–mode diode–laser pump sources", Optics Letters, vol. 18, No. 13, pp. 1062–1064, Jul. 1, 1993.

Simon et al., "Difference–frequency mixing in AgGa S$_2$ by use of high–power GaAlAs tapered semi–conductor amplifier at 860 nm", Optics Letters, vol. 18, No. 22, pp. 1931–1933, Nov. 15, 1993.

Goldberg et al., "Difference Frequency Generation of Tunable Mid–IR in Bulk Periodically Poled LiNbO$_3$", ASSL '95, pp. 2–3, Jan. 30, 1995.

Fujiwara et al., "UV–Excited Poling and Electrically Tunable Bragg Gratings in a Germanosilicate Fiber", Optical Fiber Conference '95, pp. 1–5, Feb., 1995.

Goldberg et al., "Widely tunable difference frequency generation in QPM–LiNbO$_3$" Paper CPD49, Conference on Lasers and Electro–optics (1995) pp. 1–2.

Sanders et al., "Generation of 3.0$\mu$m radiation by quasi–phasematched difference frequency mixing of near IR laser diode wavelengths in LiNbO$_3$ waveguides", CLEO '94, pp. 287–288.

(List continued on next page.)

Primary Examiner—Leon Scott, Jr.
(74) Attorney, Agent, or Firm—W. Douglas Carothers, Jr.

(57) ABSTRACT

Laser diode pumped mid-IR wavelength sources include at least one high power, near-IR wavelength, injection and/or sources wherein one or both of such sources may be tunable providing a pump wave output beam to a quasi-phase matched (QPM) nonlinear frequency mixing (NFM) device. The NFM device may be a difference frequency mixing (DFM) device or an optical parametric oscillation (OPO) device. Wavelength tuning of at least one of the sources advantageously provides the ability for optimizing pump or injection wavelengths to match the QPM properties of the NFM device enabling a broad range of mid-IR wavelength selectivity. Also, pump powers are gain enhanced by the addition of a rare earth amplifier or oscillator, or a Raman/Brillouin amplifier or oscillator between the high power source and the NFM device. Further, polarization conversion using Raman or Brillouin wavelength shifting is provided to optimize frequency conversion efficiency in the NFM device.

8 Claims, 15 Drawing Sheets

OTHER PUBLICATIONS

Bortz et al., "Quasi–phase–matched optical parametric amplification and oscillation in periodically poled $LiNbO_3$ waveguides", Optics Letters, vol. 20, No. 1, Jan. 1, 1995, pp. 49–51.

Myers et al., "Quasi–phase matched 1.064μm–pumped optical parametric oscillator in bulk periodically poled $LiNbO_3$", Optics Letters, vol. 20, No. 1, Jan. 1, 1995, pp. 52–54.

Burns et al., "Second Harmonic Generation in Field Poled, Quasi–Phase Matched, Bulk $LiNbO_3$", IEEE Photonics Technology Letters, vol. 6, No. 2, Feb. 1994, pp. 252–254.

Webjorn et al., "Quasi–phase–matched blue light generation in bulk lithium niobate, electrically poled via periodic liquid electrodes", Electronics Letters, vol. 30, No. 11, May, 26, 1994, pp. 894–895.

Webjorn et al., "Electric–field–induced periodic domain inversion in $Nd^{3+}$–diffused $LiNbO_3$", Electronics Letters, vol. 30, No. 25, Dec. 8, 1994, pp. 2135–2136.

* cited by examiner

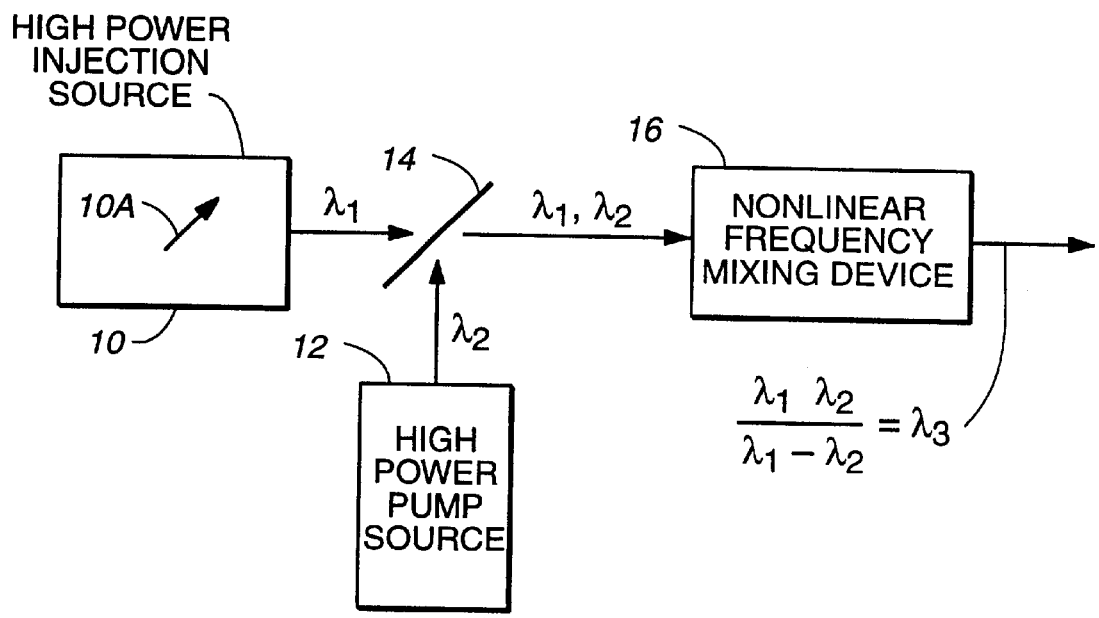
FIG._1A
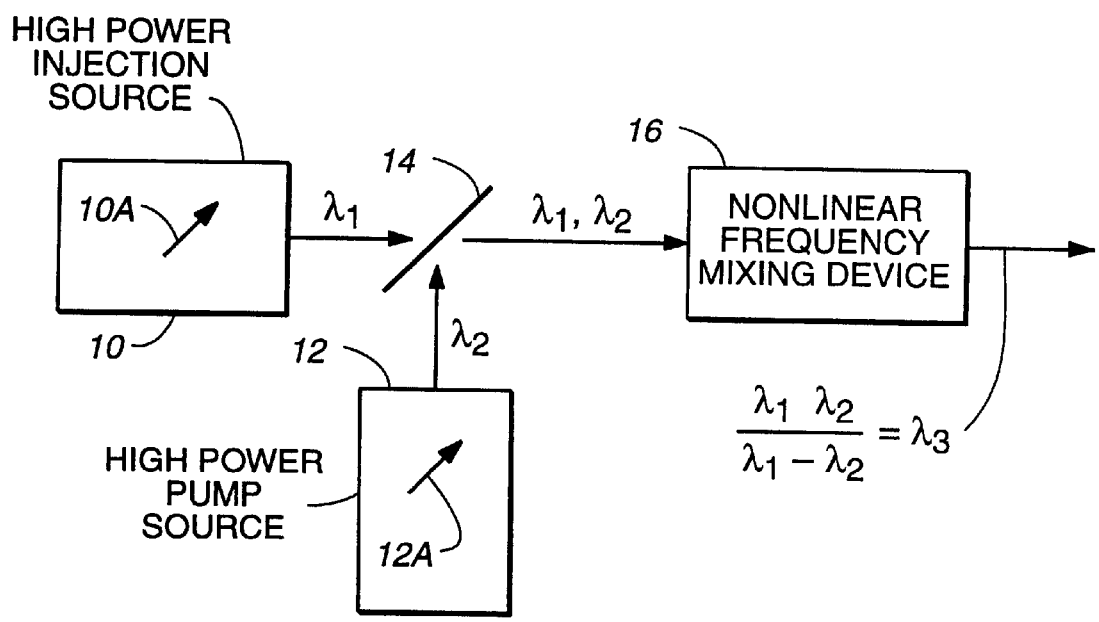
FIG._1B

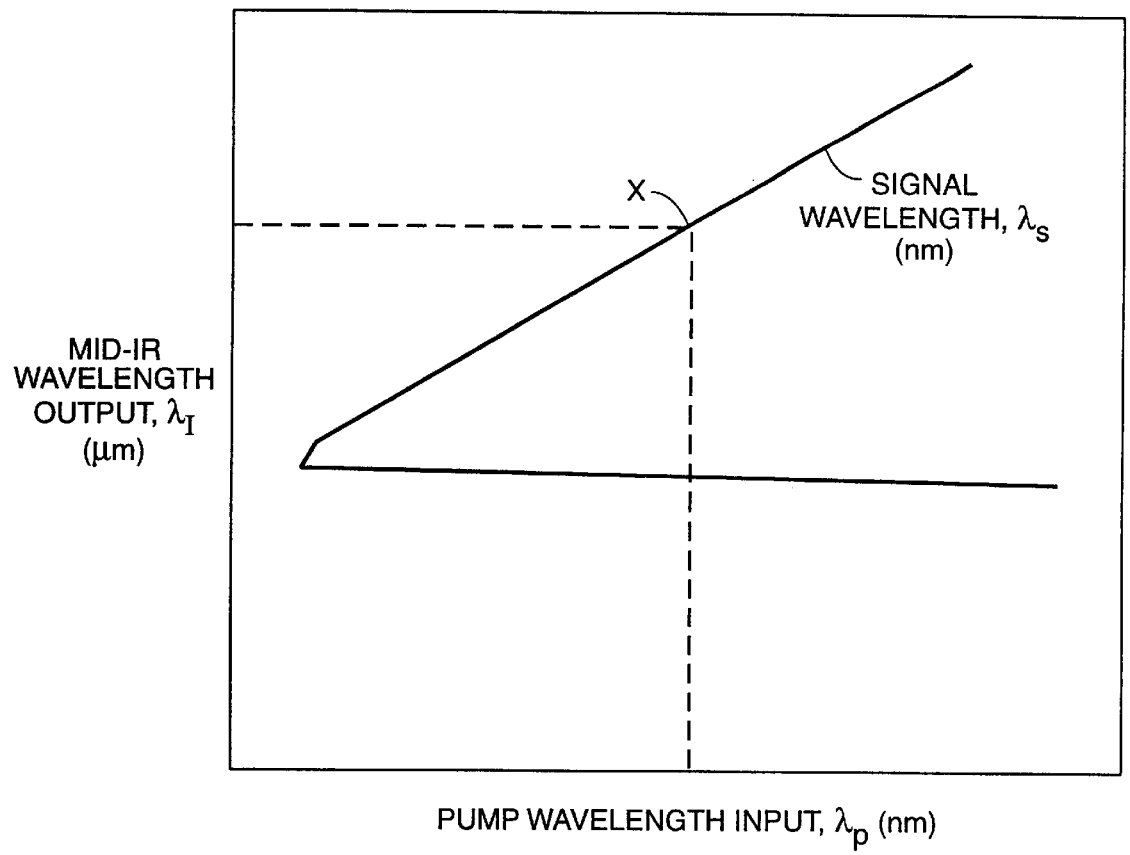
FIG._1C
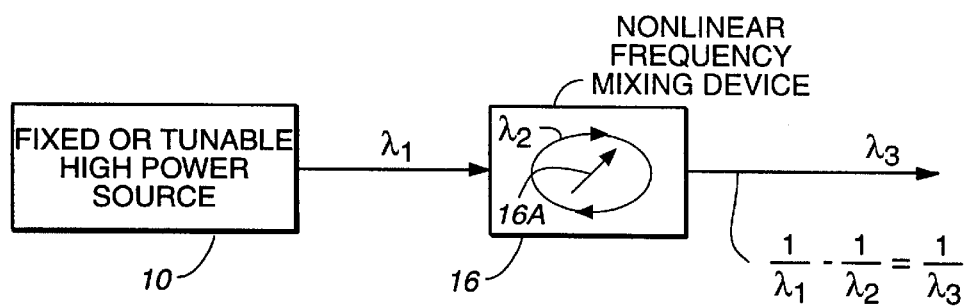
FIG._1D

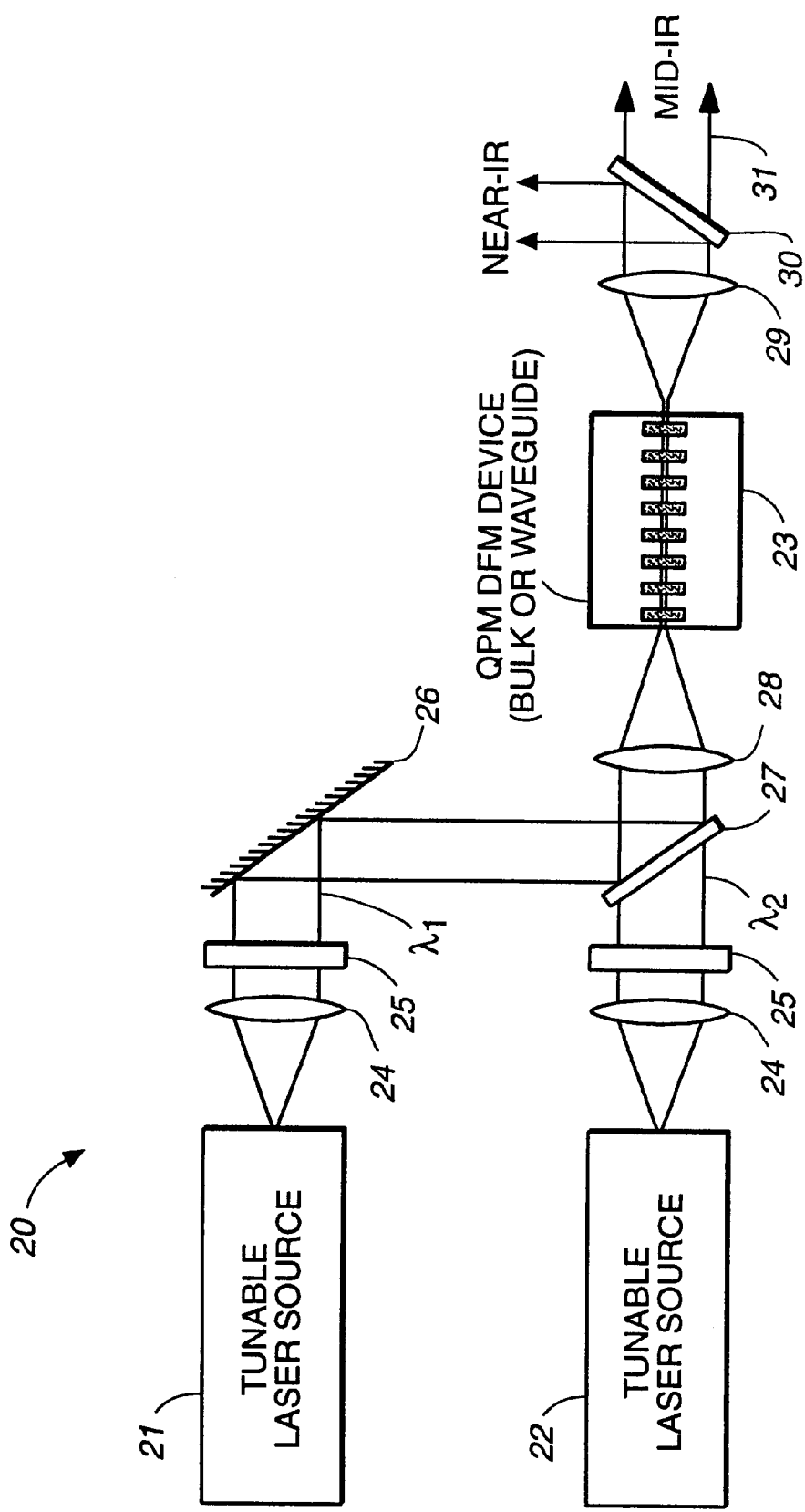
FIG._2

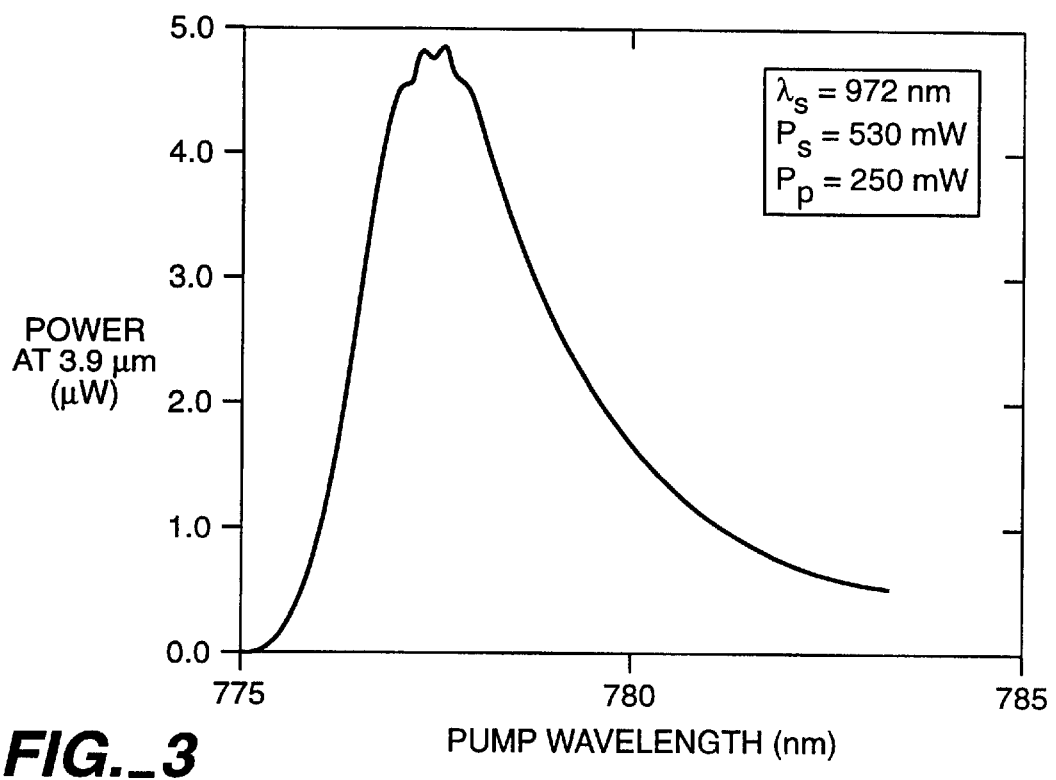
FIG._3
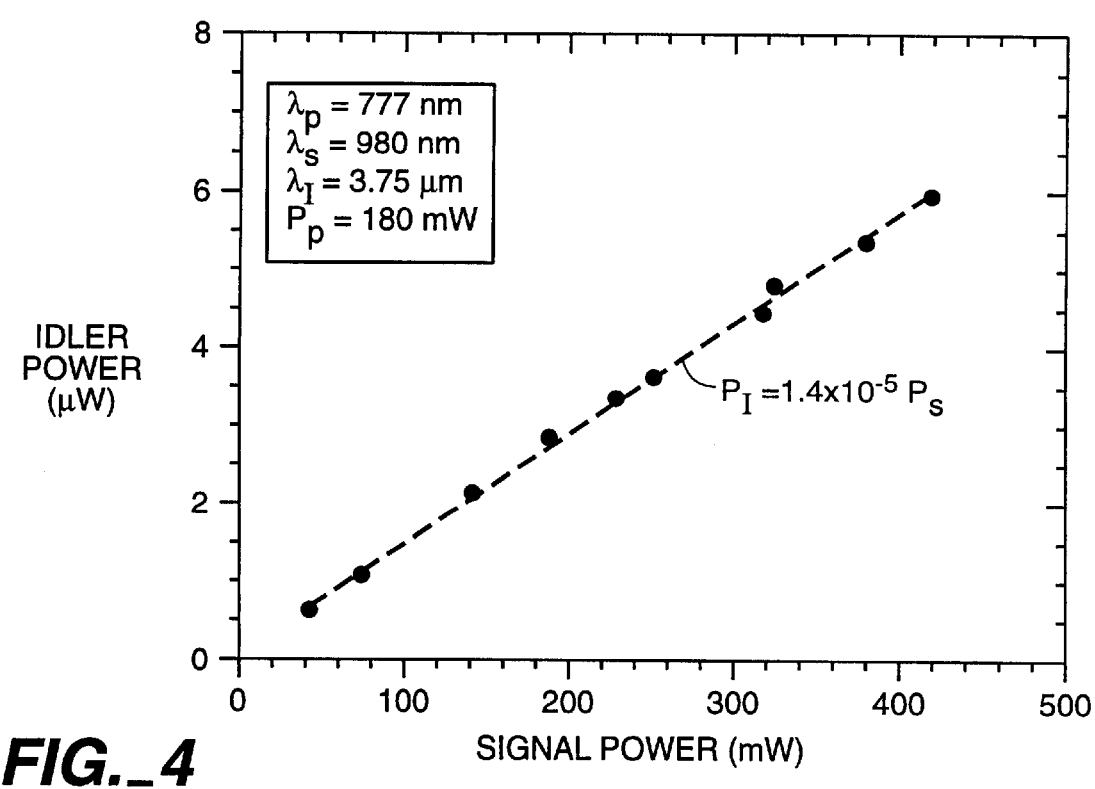
FIG._4

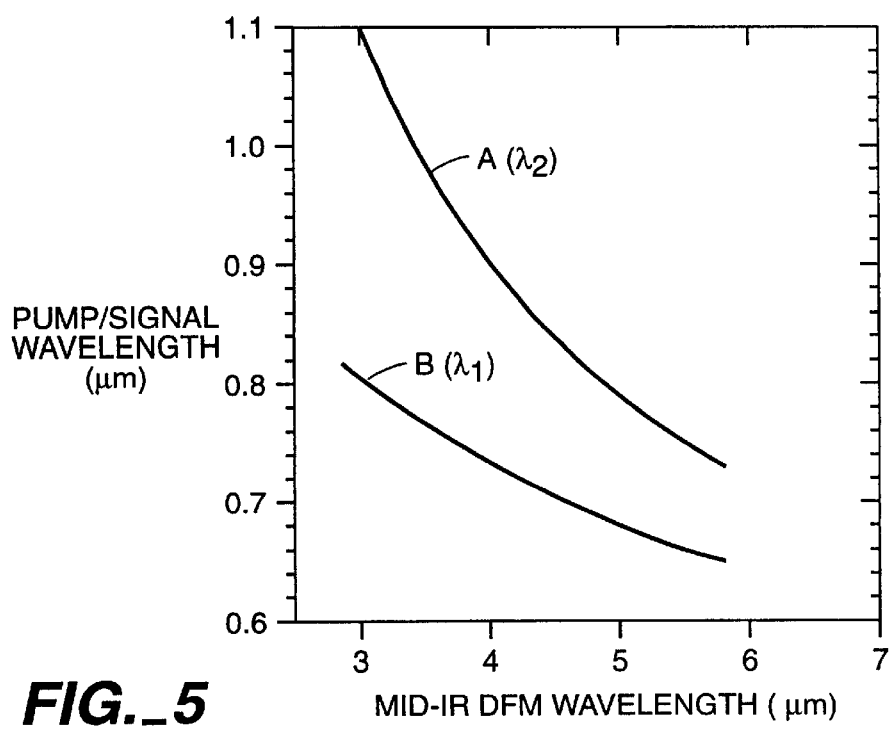
FIG._5
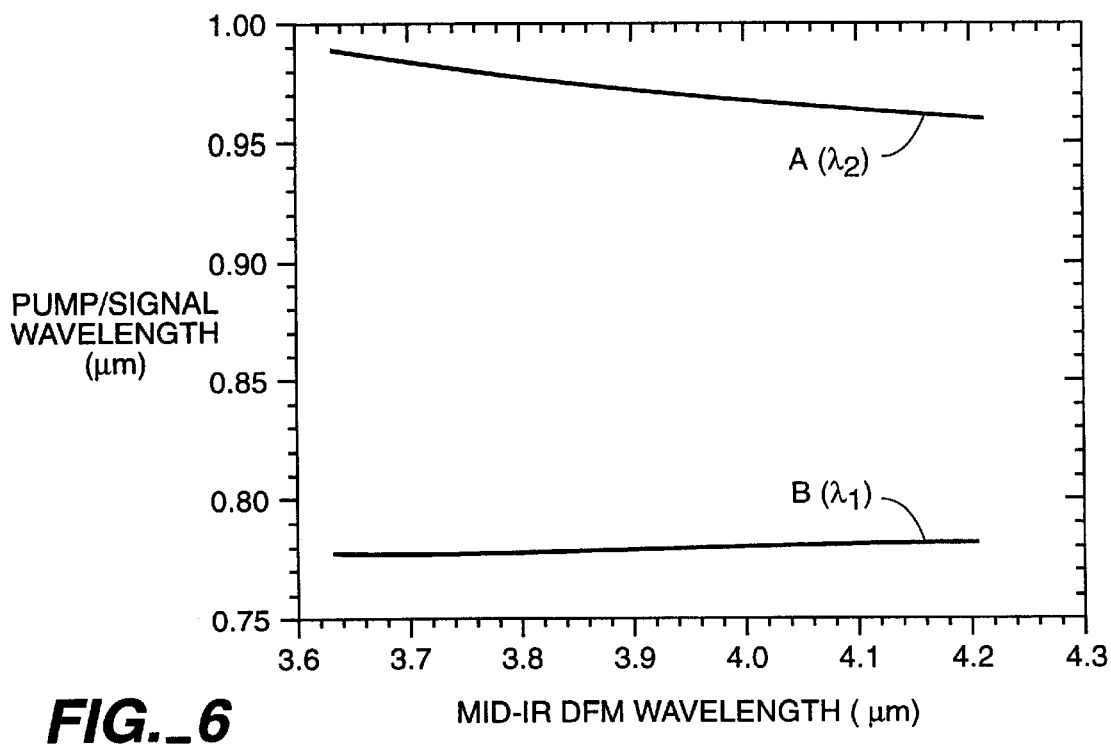
FIG._6

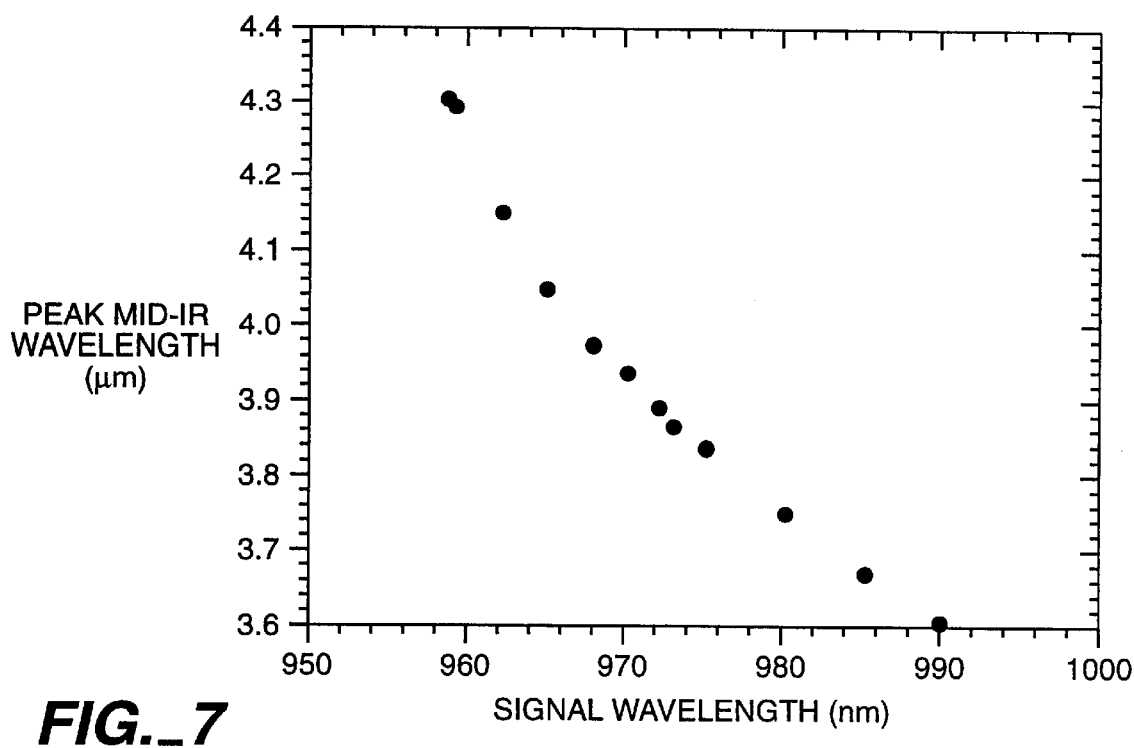
FIG._7
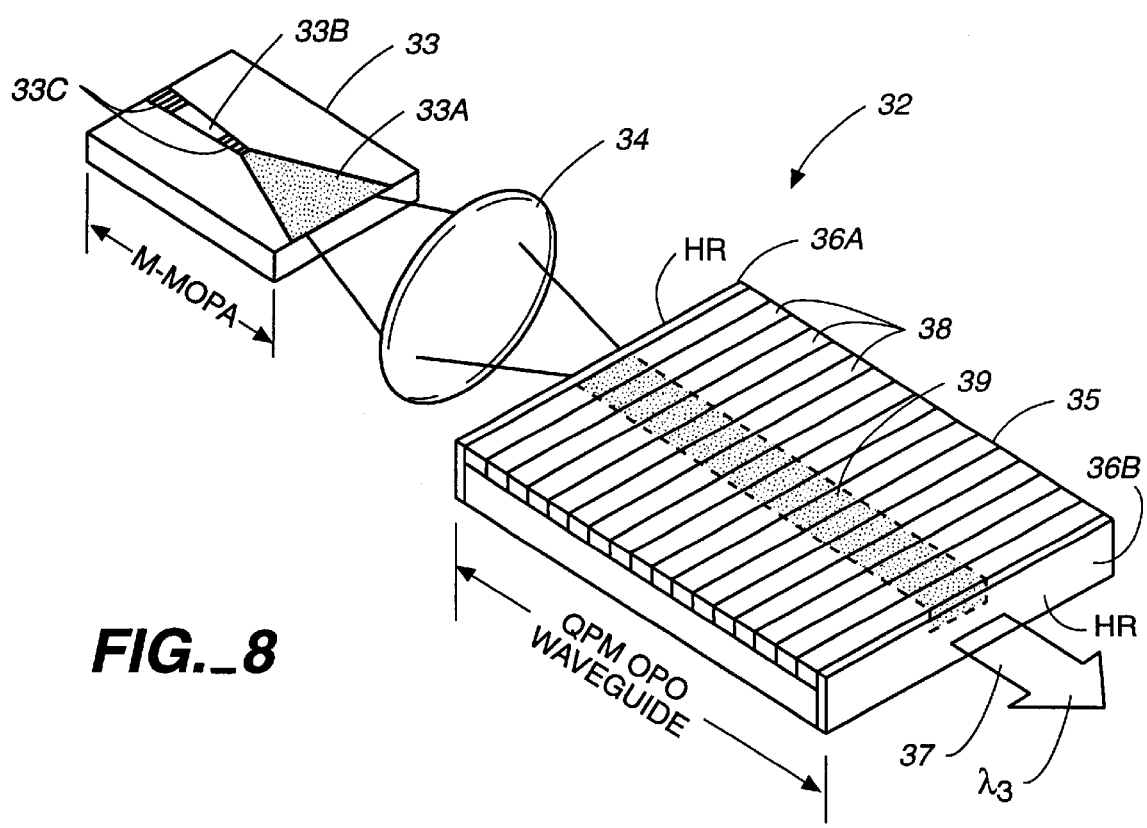
FIG._8

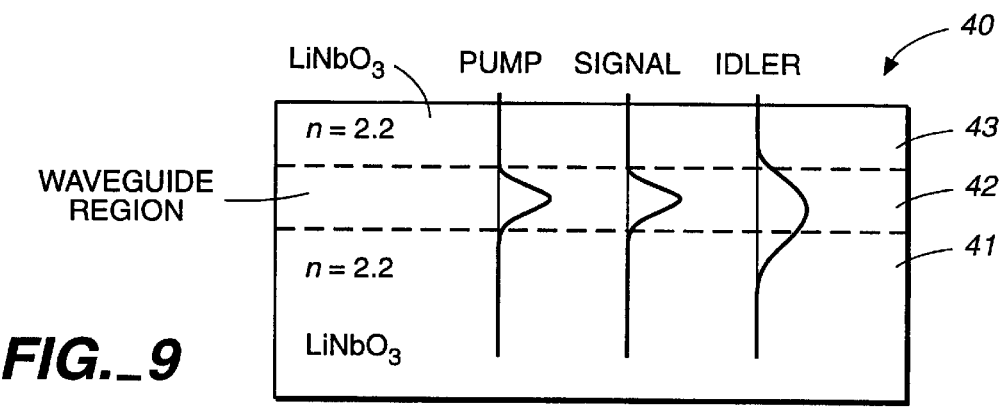
FIG._9
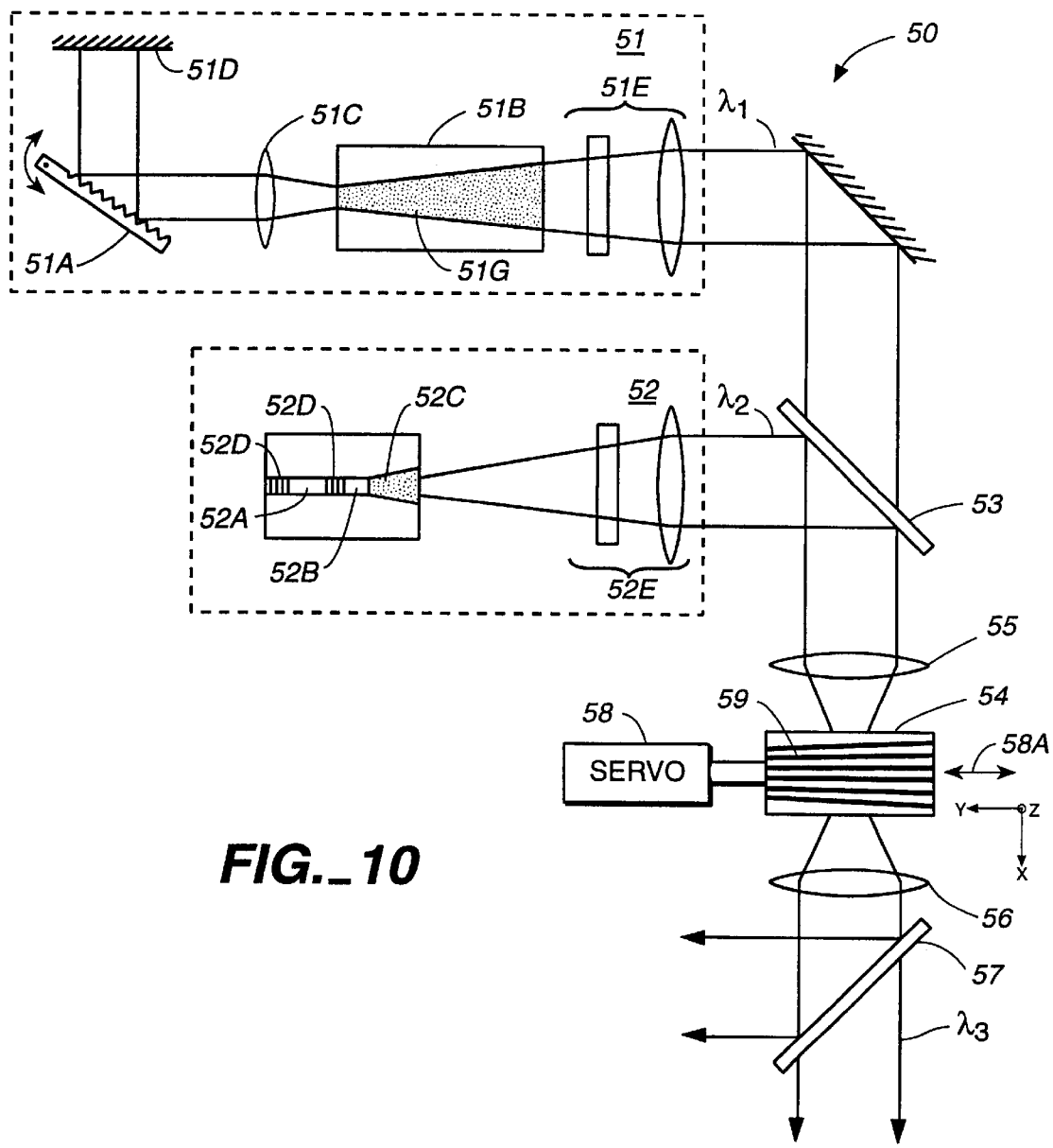
FIG._10

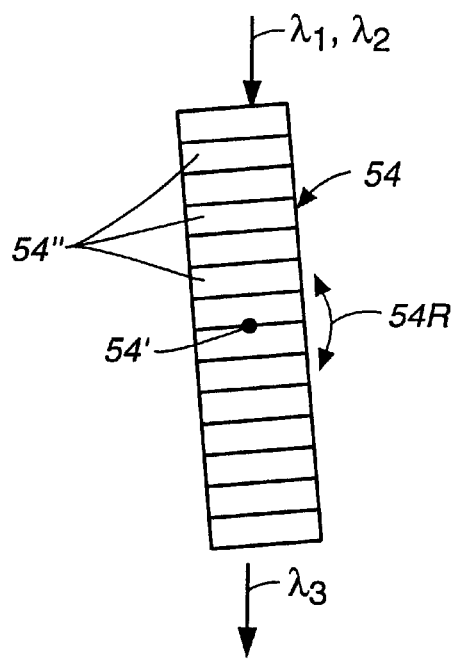
FIG._10A
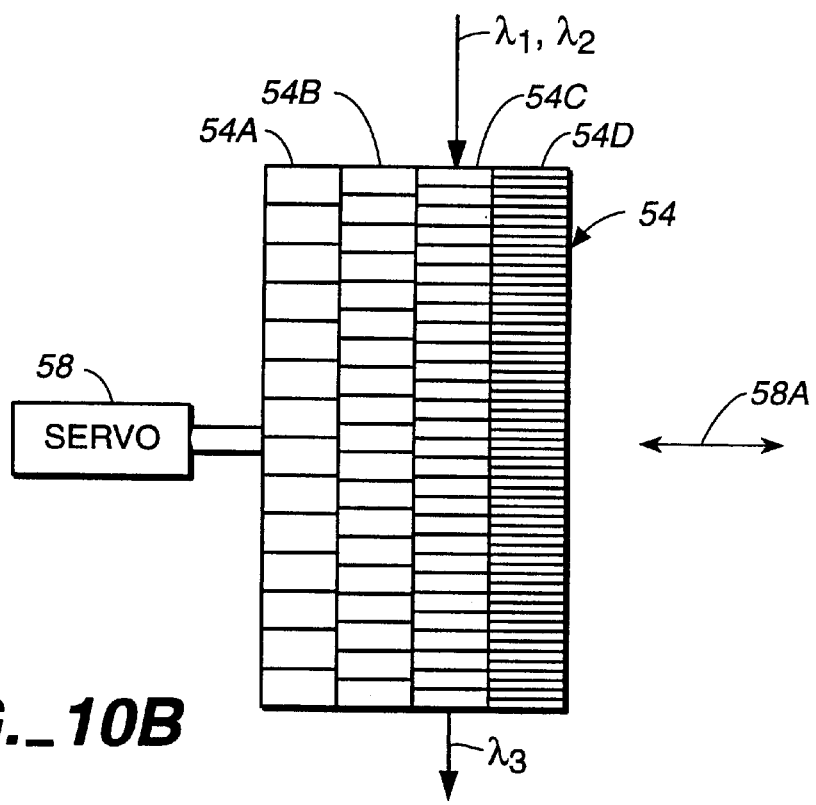
FIG._10B

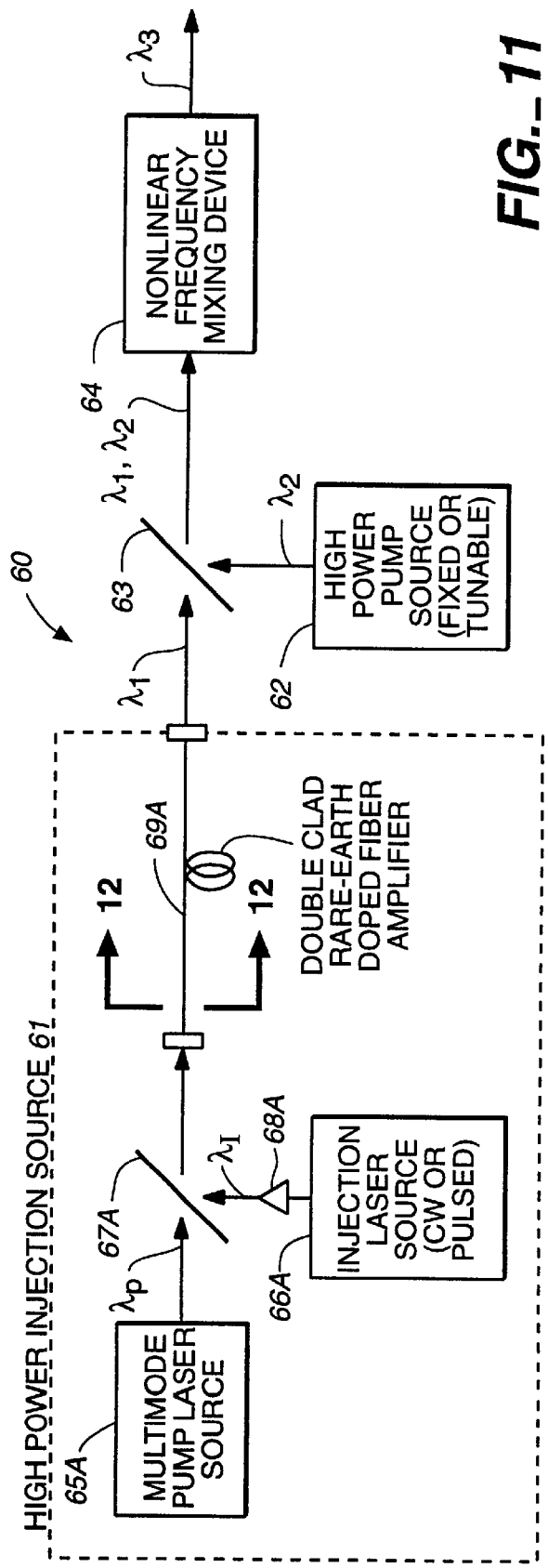
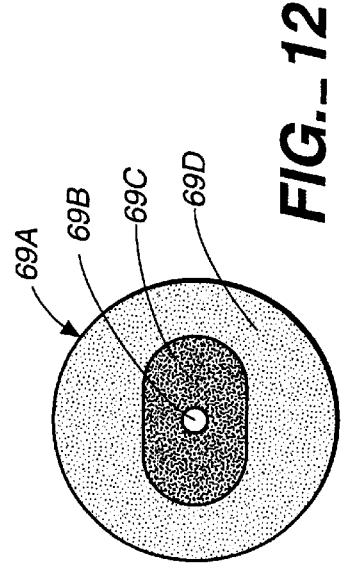
FIG._11
FIG._12

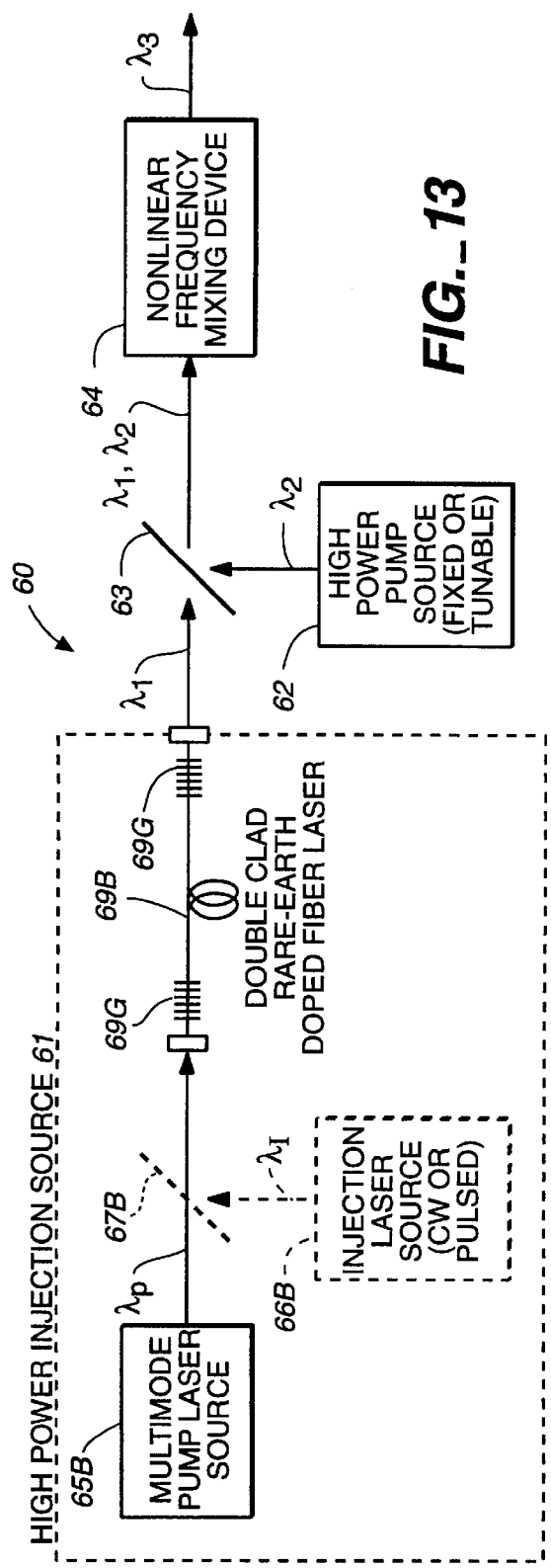
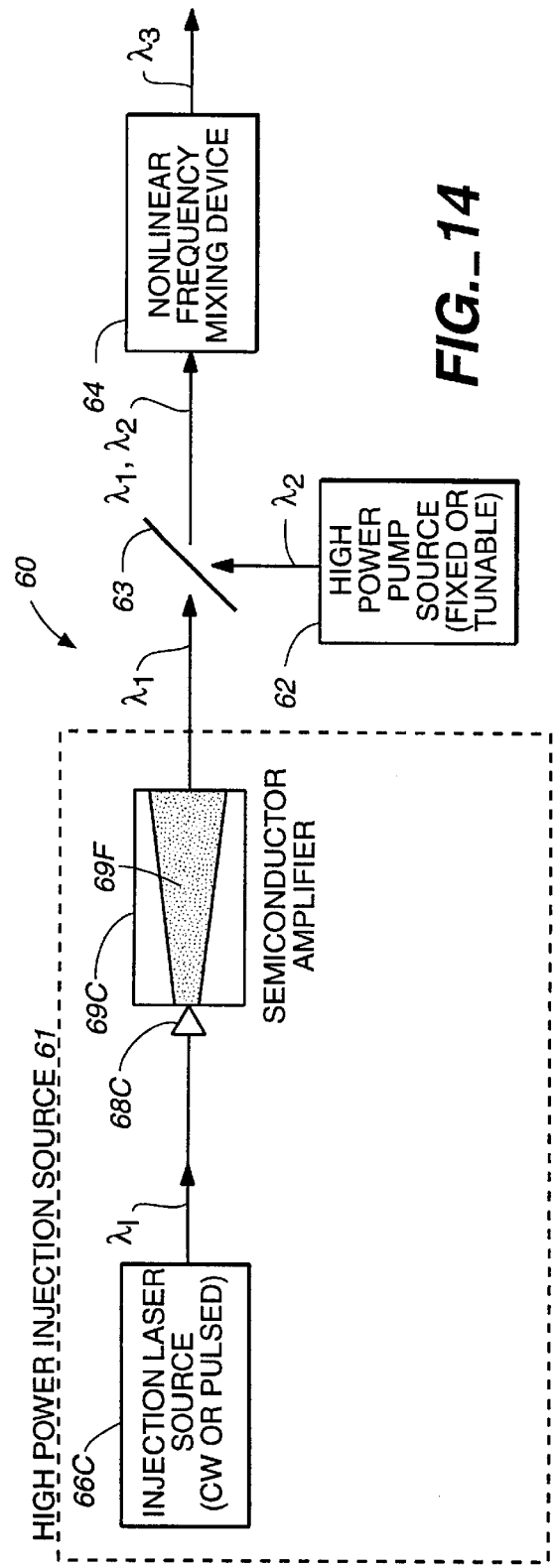
FIG._13
FIG._14

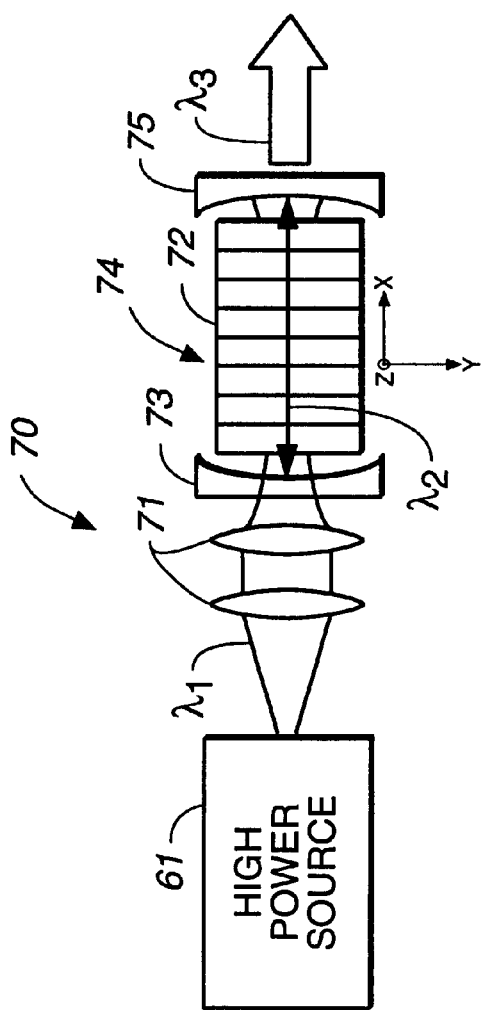
FIG._15
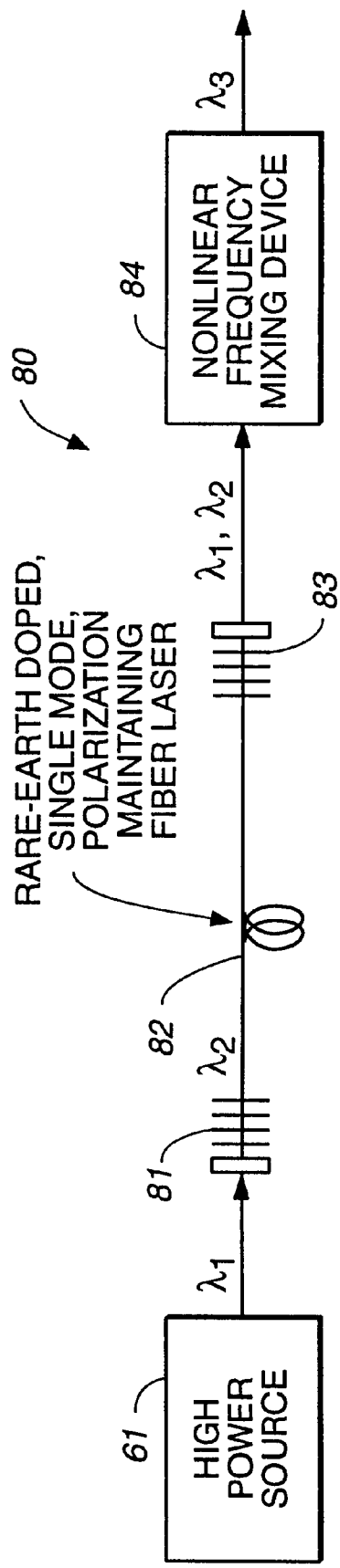
FIG._16

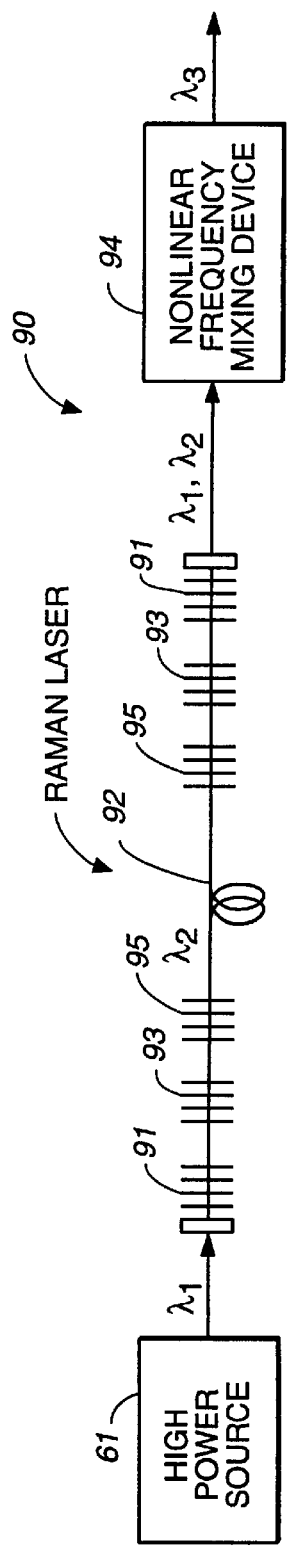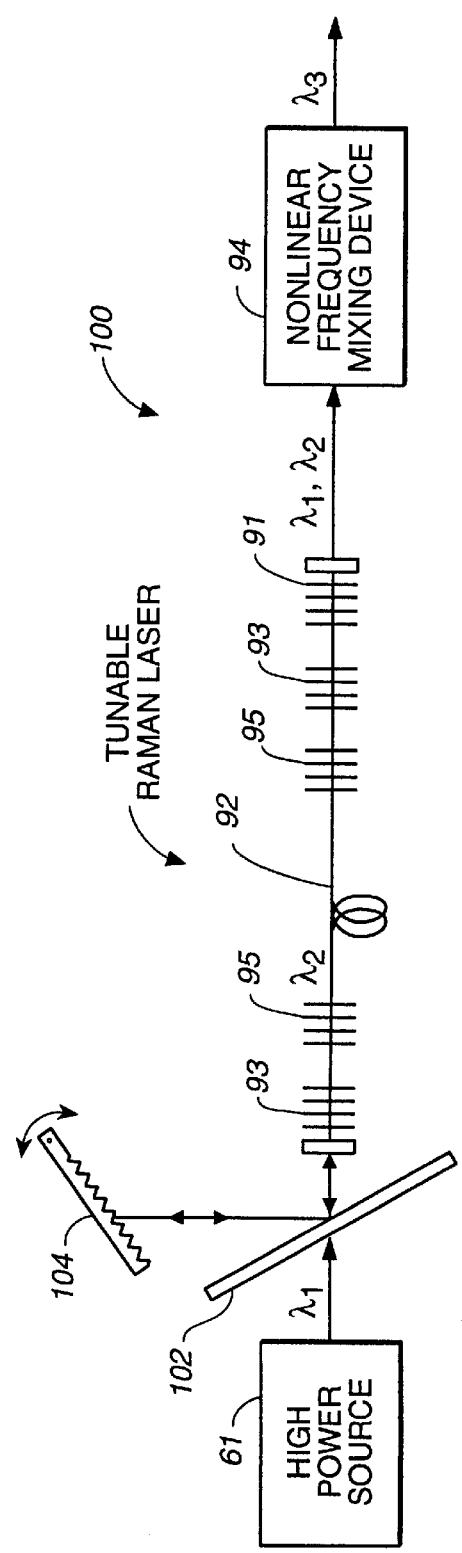
FIG._17
FIG._18

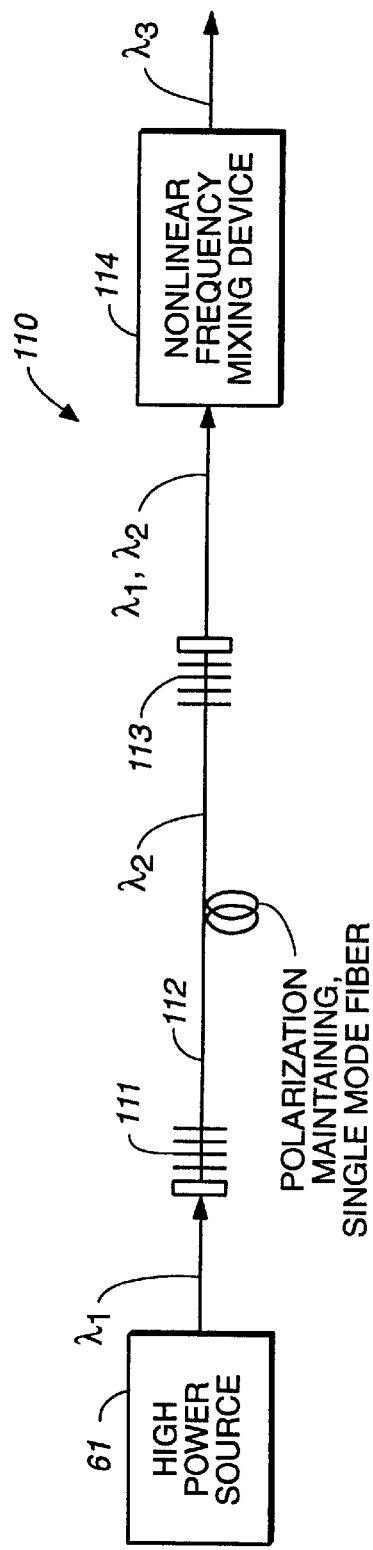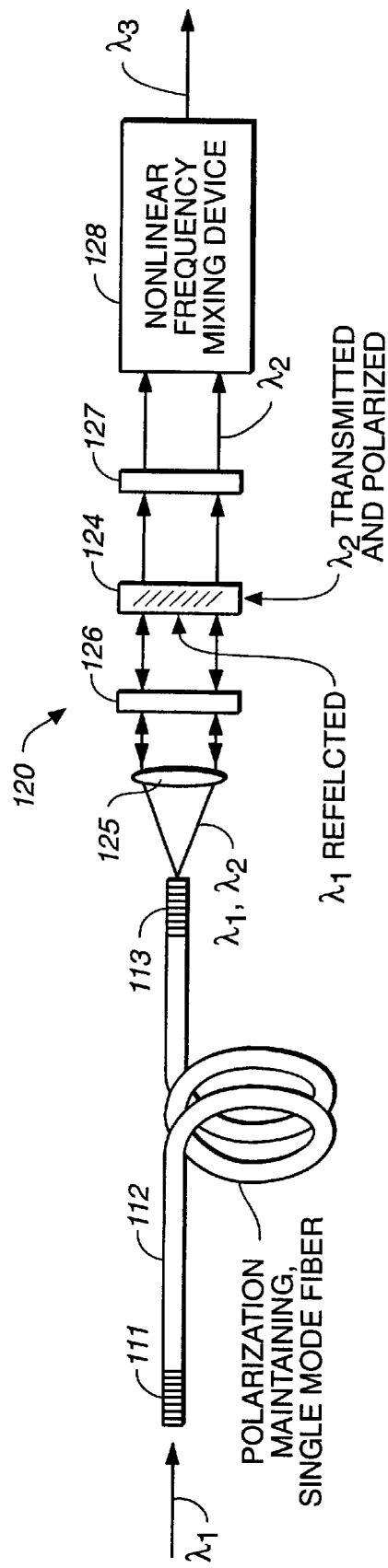
FIG._19
FIG._20

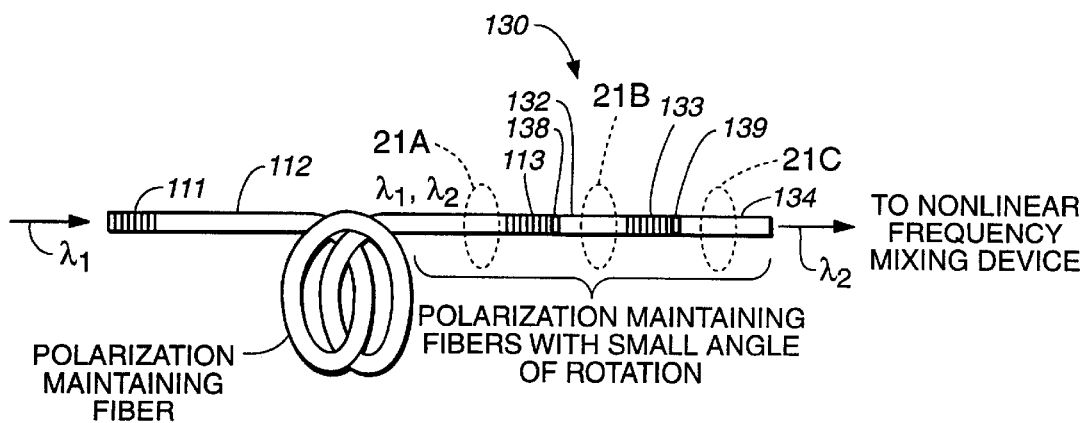
FIG._21
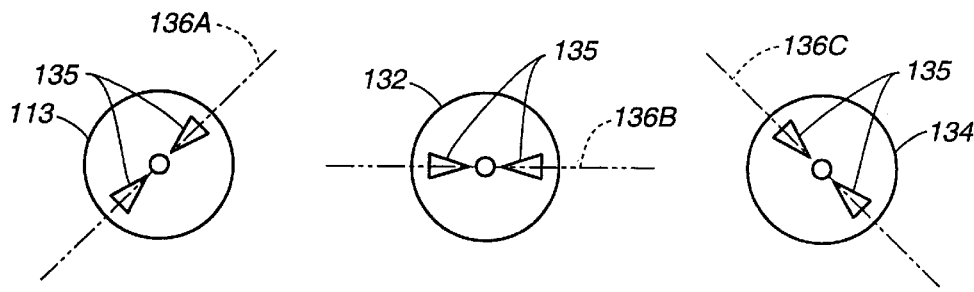
FIG._21A FIG._21B FIG._21C
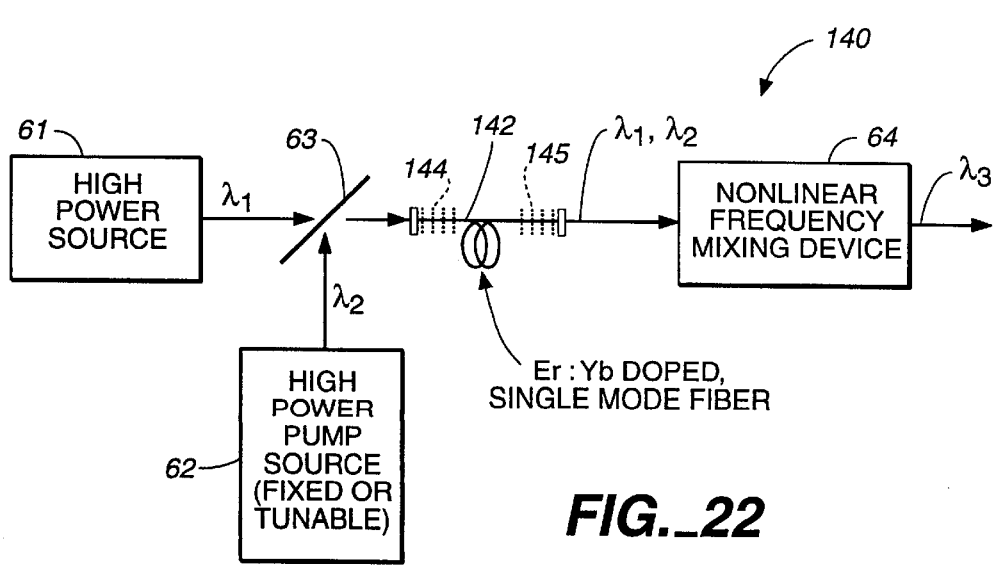
FIG._22

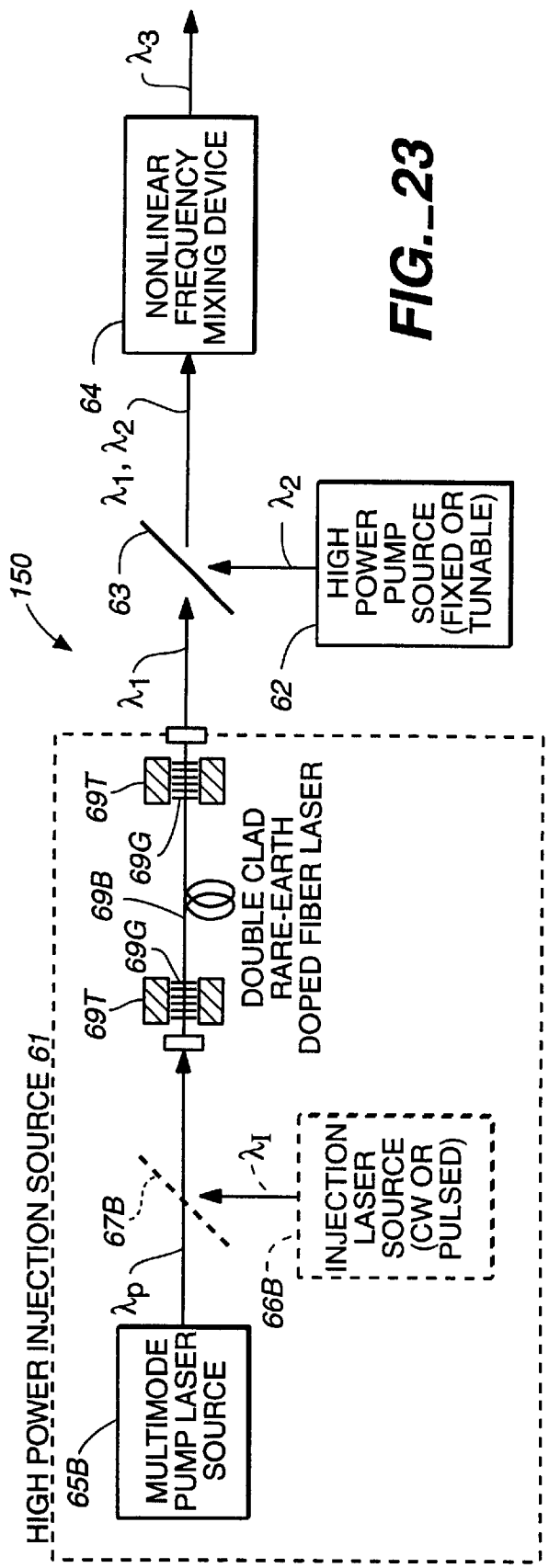
FIG._23
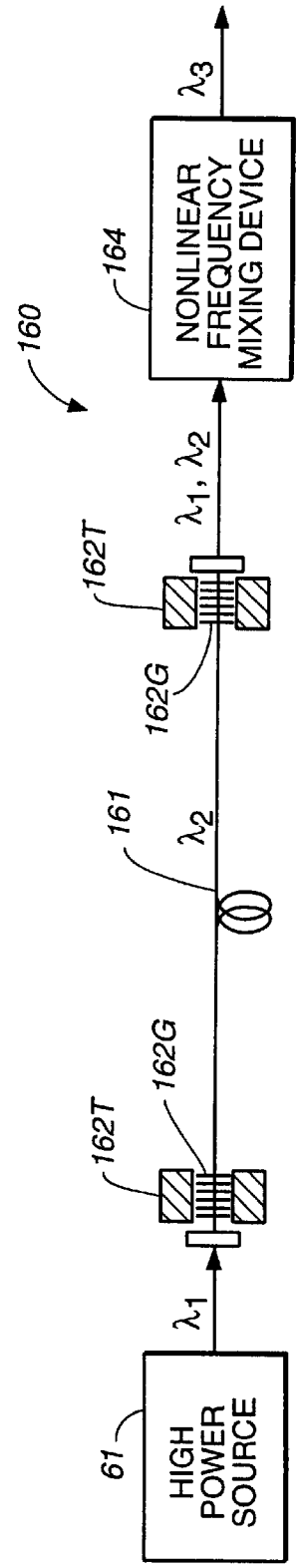
FIG._24

FREQUENCY CONVERSION SYSTEM

CROSS REFERENCE TO RELATED APPLICATION

This application is a divisional application of patent application Ser. No. 09/123,387, filed Jul. 27, 1998 which is a divisional application of patent application Ser. No. 08/649,560, filed May 17, 1996, now U.S. Pat. No. 5,912,910.

STATEMENT AS TO RIGHT TO INVENTIONS MADE UNDER FEDERALLY SPONSORED RESEARCH AND DEVELOPMENT

This invention was made with government support under Contract No. NAS2-14200, awarded by the National Aviation Space Administration (NASA AMES) and under Contract No. DASG60-94-C-0043, awarded by the Defense Advanced Research Projects Agency (DARPA). The government has certain rights in the invention.

FIELD OF THE INVENTION

This invention relates generally to frequency conversion devices and high power sources for such devices, and more particularly to wide-range frequency sources that convert coherent near-infrared radiation to coherent mid-infrared radiation using nonlinear frequency mixing or conversion, such as by difference frequency mixing (DFM) and optical parametric oscillation (OPO).

BACKGROUND OF THE INVENTION

There is a great interest and need for developing compact, reliable high power mid-infrared radiation (mid-IR) sources for many types of applications, such as, spectroscopy, environmental monitoring, gas and chemical sensing and manufacturing process control. The most serious limitations to practical mid-IR sources has been the complexity of the near-IR pump source required and the cost, stability and reliability of nonlinear mixing mediums. However, nonlinear frequency mixing of high power near-IR laser diode sources would be an attractive technique for generating broadly tunable coherent mid-IR frequencies, such as in the range of about 2.0 $\mu$m to 5.0 $\mu$m.

The use of high power laser diodes for frequency conversion have been contemplated for sum or difference frequency mixing (SFM or DFM) applications, such as shown in FIG. 6 of U.S. Pat. No. 5,321,718, which is commonly owned by the assignee of this application and is incorporated herein by reference thereto. Disclosed are a pair of high tunable power laser diodes tuned to emit radiation of different wavelengths $\lambda_1$, $\lambda_2$, the beams of which are subsequently combined and provided as input to a nonlinear crystal device for difference frequency mixing producing a mid-infrared output of wavelength $\lambda_3=\lambda_1 \cdot \lambda_2/(\lambda_1-\lambda_2)$ or for sum frequency mixing producing blue or green light output of wavelength $\lambda_3=\lambda_1 \cdot \lambda_2/(\lambda_1+\lambda_2)$.

Presently, there are no reliable room temperature operated, broadly tunable mid-IR sources that are sufficiently compact to provide for an output over broad mid-range infrared radiation. No direct room temperature laser diode sources are available at wavelengths longer than about 2.4 $\mu$m. Other sources, for example, employ comparatively large, higher than room temperature operated lasers, such as a $Ar^+$ laser pumping a Ti:sapphire, YAG laser or a dye laser. Moreover, nonlinear frequency mixing to achieve desired long wavelength frequencies requires better frequency conversion performance in presently available materials. The existing nonlinear frequency mixing (NFM) techniques employed for frequency doubling or extending are quasi-phase matching (QPM) with difference frequency mixing (DFM) and optical parametric oscillation (OPO).

So far, mid-IR generation by difference frequency mixing (DFM) has been demonstrated using laser diodes, in lieu of gas lasers, with a $AgGaS_2$ and $AgGaSe_2$ material utilizing noncritical birefringent phase matching (BPM) and, also, by quasi-phase matching (QPM) using $LiNbO_3$ waveguide material. An example of the former is found in U. Simon et al., "Difference Frequency Generation in $AgGaS_2$ by Use of Single Mode Diode Laser Pump Sources", Optics Letters, Vol. 18(13), pp. 1062–1064 (Jul. 1, 1993), which involved the feasibility of using two single mode laser diodes as pump sources mixed in $AgGaS_2$ crystal generating about 3 nW of low end, mid-IR power at about 2 $\mu$m. Tunability is suggested but is limited to tuning by means of varying the temperature and current of the diodes by permitting their emission wavelength to be tuned over its narrow bandwidth, e.g., 2 nm which would correspond to about a range of 18 nm tuning of the mid-IR wavelength from the $AgGaS_2$ crystal (page 1063, col. 1, first full paragraph). Moreover, it has been proposed by U. Simon et al. in the article, "Difference frequency Mixing in $AgGaS_2$ by Use of a High Power GaAlAs Tapered Semiconductor Amplifier at 860 nm", Optics Letters, Vol. 18(22), pp. 1931–1933 (Nov. 15, 1993) to provide one of the sources, the signal or injection source, as a single mode, master laser diode pumping a semiconductor flared amplifier to enhance the pumping power output to about 1.5 W as input, together with the output from a Ti:sapphire laser as the pumping wave to the QPM DFM $AgGaS_2$ crystal.

As for the employment of $LiNbO_3$ waveguides, the article of L. Goldberg et al., "Difference Frequency Generation of Tunable Mid-IR, in Bulk Periodically Poled $LiNbO_3$", Advance Solid-State Lasers, (Post-deadline paper), pp. PD23-1 to PD23-3 (Jan. 30, 1995) and L. Goldberg et al., "Widely Tunable Difference Frequency Generation in QPM-$LiNbO_3$", Paper CPD49, Conference on Laser and Electro-Optics (CLEO May, 1995), discloses a tunable QPM DFM in a bulk periodically poled $LiNbO_3$ using Nd:YAG and Ti:sapphire laser as pumping sources with the DFM wavelength tuned over a range of about 3.0 $\mu$m to 4.0 $\mu$m by tuning the Ti:sapphire laser or rotating the QPM $LiNbO_3$ crystal to change the effective grating period. The disadvantage of the foregoing systems for achieving mid-IR generation is the lack of room temperature, mid-IR tunability over a large expansive mid-IR range of 2.0 $\mu$m to 5.0 $\mu$m and lack of a delivery system for mid-IR generation that is compact in size, less costly and not requiring large size solid state and gas lasers operating at elevated temperatures requiring large operating powers.

$LiNbO_3$ waveguide material is a robust, relatively inexpensive, highly reliable nonlinear material for DFM, and QPM permits the material to be tailored to mix arbitrary laser diode wavelengths through the choice of an appropriate ferroelectric domain reversal period or periodic poling. Recent advances in electric filed poling of $LiNbO_3$ waveguide material allows QPM to be implemented in bulk interactions and has been employed in demonstrating mid-IR optical parametric oscillation (OPO). See L. E. Myers et al., "Quasi-Phase Matched 1.064 $\mu$m-Pumped Optical Parametric Oscillator in Bulk Periodically Poled $LiNbO_3$", Optics Letters, Vol. 30(1), pp. 52–54 (Jan. 1, 1995) and, W. K. Burns et al., "Second Harmonic Generation in Field Poled, Quasi-Phase Matched, Bulk $LiNbO_3$", IEEE Photonics *Technology Letters*, Vol. 6(2), pp. 252–254 (February, 1994). However, mid-IR generation has been demonstrated in quasi-phase matching (QPM) crystals relative to such laser diode sources only for relatively shorter wavelength applications and not reliably extended to more desired mid-IR wavelength applications. Moreover, as applied to $AgGaS_2$ and $AgGaSe_2$ crystals, the full spectral range of mid-IR generation cannot be easily derived because the input wavelength range required to over the full 2.0 μm to 5.0 μm mid-IR range is very broad for noncritical phase atching.

What is needed is a mid-IR generating system providing for noncritical phase atching over a wide range of near-IR input wavelengths at room temperature that can be frequency mixed to selectively provide a desired mid-IR wavelength over the entire mid-IR range from about 2.5 μm to 5 μm.

An object of this invention is the provision for mid-IR frequency conversion over a wide frequency range.

Another object of this invention is the provision for high power, semiconductor/optical amplifier/laser sources as applied to nonlinear frequency mixing devices, e.g., high power laser diodes, master oscillator power amplifier (MOPA) devices, high power fiber amplifier or laser, laser or amplifier devices, Raman or Brillouin amplifiers or lasers, and rare earth single mode fiber amplifiers and lasers.

Another object of this invention is the provision of the use of near-IR laser diode sources to generate broadly tunable coherent mid-IR radiation, such as tunable across the mid-IR range of 2 μm to 5 μm.

Another object of this invention is the provision of a compact, room temperature, broadly tunable coherent source for selectively tuning a desired mid-IR wavelength.

Another object of this invention is the provision of high efficiency buried non-linear waveguide structures using quasi-phase matching (QPM) to convert developed near-IR power from room temperature laser sources to mid-IR power for use, for example, in a large spectrum of analysis, sensing and monitoring applications.

SUMMARY OF THE INVENTION

According to this invention, a frequency conversion system comprises first and second gain sources, at least one of which is tunable, the outputs of which are combined for injection input to a nonlinear frequency mixing (NFM) device, such as a quasi-phase matching difference frequency mixing (QPM DFM) device or a quasi-phase matching optical parametric oscillation (QPM OPO) device to selectively provide a mid-IR frequency as output in the range of 2.0 μm to 5.0 μm. Tunability is accomplished by lateral translation of the nonlinear frequency device to select one of a plurality of quasi-phase matching periods.

By extending the tunability of the pump source wavelengths for QPM frequency mixing, the range of possible mid-IR wavelengths is greatly extended without being significantly affected by the absorption limitations of the crystal material employed for frequency mixing. Suitable materials in the past, e.g., $AgGaS_2$ and $AgGaSe_2$, provided tunability for noncritical birefringent phase matching required for large input wavelength tuning ranges such as between 680 nm to 1100 nm to possibly achieve the full mid-IR radiation spectrum. However, by employing QPM nonlinear crystals, such as $LiNbO_3$, input mixing wavelengths can be tuned over shorter wavelength ranges to provide for broader tuning selectability of mid-IR wavelengths. As an example, QPM DFM can be accomplished over the full mid-IR radiation spectrum with one fixed signal wavelength input of 1100 nm and the other pump wavelength tuned between the narrow range of 775 nm to 900 nm or by mixing the output wavelengths of two separate tunable laser diodes one tunable in the near-IR range of 730 nm to 833 nm and the other tunable in the near-IR range of 1000 nm to 1150 nm.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1A is a schematic illustration of a first configuration of a tunable high power, laser diode mid-IR wavelength source employing a NFM device and two high power injection/pump input sources wherein one of them is tunable to achieve a selectively tuned mid-IR wavelength idler output.

FIG. 1B is a schematic illustration of a second configuration of a tunable high power, laser diode mid-IR wavelength source employing a NFM device and two high power injection/pump input sources wherein both of them are tunable to achieve a selectively tuned mid-IR wavelength idler output.

FIG. 1C is a graphic illustration of the general relationship between pump, injection (signal) and idler wavelength selection employing a tunable high power, laser diode mid-IR wavelength source.

FIG. 1D is a schematic illustration of a third configuration of a fixed or tunable high power, laser diode mid-IR wavelength source employing a NFM device and one input laser diode pump source wherein either the laser diode and/or the non-linear frequency mixing device is tunable to achieve a selectively tuned mid-IR wavelength output.

FIG. 2 is a more detailed embodiment based upon the embodiment of FIG. 1B employing a QPM waveguide for single pass, difference frequency mixing (DFM).

FIG. 3 is a graphic illustration of mid-IR power output in AW for a given mid-IR wavelength versus near-IR pumping wavelength input in nanometers for a tunable high power, laser diode pumped amid-IR wavelength source according to FIG. 1B.

FIG. 4 is a graphic illustration of DFM idler or mid-IR power versus signal power for fixed pump power for the tunable high power, laser diode pumped mid-IR wavelength source according to FIG. 1B.

FIG. 5 is a graphic illustration of input pump/signal wavelength combinations for wavelength phase matching in $AgGaS_2$ crystal.

FIG. 6 is a graphic illustration of input pump/signal wavelength combinations for wavelength quasi-phase matching in a periodic poled $LiNbO_3$ crystal.

FIG. 7 is a graphic illustration of peak output mid-IR wavelengths to input signal wavelengths for the tunable high power, laser diode pumped mid-IR wavelength source according to FIG. 1B using a periodic poled $LiNbO_3$ crystal as the NFM device.

FIG. 8 is a perspective view of a more detailed embodiment based upon the configuration shown in FIG. 1D employing a QPM waveguide as a multiple pass, optical parametric oscillator (OPO).

FIG. 9 is a schematic side elevation of a buried QPM type waveguide for a NFM crystal device for use with the embodiments of this invention.

FIG. 10 is a more detailed schematic illustration of a embodiment based upon the configuration shown in FIG. 1A employing a NFM device having a progressive poling scheme comprising a monotonically changing poling period in the form of a laterally shiftable, fan-shaped poling period for varying the poling period relative to the propagating light input.

FIG. 10A is another embodiment of a progressive poling scheme comprising a rotatable NFM device for varying the poling period relative to the propagating light input.

FIG. 10B is still another embodiment of a progressive poling scheme comprising a laterally stepped poling pattern which is laterally shifted for varying the poling period relative to the propagating light input.

FIG. 11 is a schematic illustration of a high power, mid-IR wavelength pump source for a NFM device employing a fiber amplifier as an injection source.

FIG. 12 is an enlarged cross sectional view of the double-clad fiber amplifier of FIG. 11 taken along the line 12—12 of FIG. 11.

FIG. 13 is schematic illustration of a high power, mid-IR wavelength pump source for a NFM device employing a fiber laser as an injection source.

FIG. 14 is a schematic illustration of a high power, mid-IR wavelength pump source for a NFM device employing a semiconductor amplifier as an injection source.

FIG. 15 a schematic illustration of a high power, mid-IR wavelength pump source for a QPM waveguide comprising a multiple pass, optical parametric oscillator (OPO).

FIG. 16 is a schematic illustration of a high power, mid-IR wavelength pump source employing a high power laser diode and fiber laser source with a rare earth doped, single mode, polarization maintaining fiber laser.

FIG. 17 is a schematic illustration of a high power, mid-IR wavelength pump source employing a Raman wave shift, single mode fiber laser to provide the second wavelength for frequency mixing.

FIG. 18 is a schematic illustration of a high power, mid-IR wavelength pump source employing a tunable fiber oscillator to provide the second wavelength for frequency mixing.

FIG. 19 is a schematic illustration of a high power, mid-IR wavelength pump source employing a polarization maintaining single mode fiber which may be amplifier or oscillator to provide the second wavelength for frequency mixing.

FIG. 20 is a detailed schematic illustration of portion of the embodiment shown in FIG. 19 utilized with a first polarization converter for polarization maintenance of the output beam to a NFM device or other such device.

FIG. 21 is a detailed schematic illustration of portion of the embodiment shown in FIG. 19 showing a second polarization converter for polarization maintenance of the output beam to a NFM device or other such device.

FIG. 22 is a second basic configuration of a tunable high power, laser diode mid-IR wavelength source according to FIG. 1B as combined with a fiber amplifier.

FIG. 23 is a schematic illustration of a high power, mid-IR wavelength pump source employing a tunable Raman wave shift, single mode fiber oscillator to provide the second wavelength for frequency mixing.

FIG. 24 is a detailed schematic illustration of portion of the embodiment shown in FIG. 13 employing a tunable rare-earth doped fiber amplifier as part of the high power pump source.

PREFERRED EMBODIMENTS OF THE INVENTION

The following described mid-IR wavelength sources are primarily based on tunable frequency mixing of high power, near-IR laser diodes, MOPAs, fiber amplifiers or fiber lasers or oscillators, including fiber amplifiers or oscillators having polarization maintaining fibers, or rare earth doped fibers, or single mode of multimode fibers, or Raman/Brillouin waveshift formed fibers. These mid-IR wavelength sources are attractive because, compared to what is readily available in the mid-IR wavelength range involving: large, high temperature operating gas laser devices, these new devices offer broadly tunable coherent mid-IR output from a relatively low cost, compact, room temperature operating device easily adaptable for applications requiring mid-IR frequencies, such as, for example, high resolution spectroscopy and chemical and gas sensing applications.

Reference is now made to FIGS. 1A–1D illustrating various configurations for providing first and second high power optical sources, injection and pump sources, providing first and second wavelengths $\lambda_1$, $\lambda_2$ to a nonlinear frequency mixing (NFM) device to produce a third wavelength. In general, the wavelengths, $\lambda_1$, $\lambda_2$, may be near-IR frequencies capable of being produced from high power devices such as semiconductor laser diodes or amplifiers or optical fiber oscillators or amplifiers. These devices can, in turn, be utilized for difference frequency mixing, via an appropriate nonlinear crystal device to produce wavelength, $\lambda_3$, in the mid-IR frequency range between about 2 µm to about 5 µm.

With reference to FIG. 1A, a tunable high power injection source 10 provides a first wavelength beam, $\lambda_1$ (or injection wavelength $\lambda_1$), and a second fixed high power pump source 12 provides a second wavelength beam, $X_2$, (or pump wavelength $\lambda_p$). Sources 10, 12 comprise in this configuration, as well as the other configurations to be discussed, a high power diode laser, such as Model No. SDL-8630, available from SDL, Inc., 80 Rose Orchard Way, San Jose Calif. 95134, a MOPA device, a semiconductor amplifier and laser combination, or a semiconductor pumped fiber laser or amplifier. Tunable high power injection source 10 may comprise a semiconductor amplifier in combination with an external tuning cavity, such as disclosed in U.S. Pat. No. 5,392,308 to Welch et al., which is assigned to the assignee herein and is incorporated in this disclosure by reference thereto. High power sources 10, 12 are provided so that $\lambda_1 > \lambda_2$. Also, it should be noted that source 12 may be the tunable source and source 10 may be the fixed source.

Beams $\lambda_1$, $\lambda_2$ are combined from sources 10, 12 by means of dichroic beam splitter or combiner 14, and the combined beam is provided as input to NFM device 16. Device 16 is a noncritical, single pass, quasi-phase matching (QPM), difference frequency mixing (DFM) device comprising a crystal or waveguide structure made, for example, from such material as $LiTaO_3$, $LiNbO_3$, KTP, $AgGaS_2$ or $AgGaSe_2$. Device 16 is periodically poled device, as known in the art, which receives the combined beam input, $\lambda_1$, $\lambda_2$, to be frequency mixed. The output of NFM device 16 generates a frequency mixed beam having an idler wavelength, $\lambda_3$, in the mid-IR range. The idler wavelength, $\lambda_3$ (or $\lambda_I$) is derived by the difference frequency equation, $\lambda_3 = \lambda_1 \cdot \lambda_2 / \lambda_1 - \lambda_2$.

In application, as indicated above, at least one of the high power sources, such as source 10, is tunable, indicated by arrow 10A, and may have, for example, an tunable wavelength between 775 nm to 900 nm or other wavelength, while the other high power source 12 may have a substantially stable frequency, for example, at 1100 nm. Such a stable frequency device may of the type disclosed in U.S. Pat. No. 5,485,481 to Ventrudo et al., which is assigned to the assignee herein and is incorporated in this disclosure by reference thereto. It also may be a monolithic master oscillator power amplifier (M-MOPA) laser diode source similar to SDL Model Number 5760-A6, manufactured by SDL, Inc. of San Jose, Calif. The combined outputs provided to NFM device 16 produce a longer wavelength having a mid-IR frequency in the range of about 2.5 µm to about 5.0 µm.

As is known in the art, periodic nonlinear coefficient patterning of device 16 may be accomplished by titanium indiffusion in $LiNbO_3$, by proton exchange and anneal, by heat treatment or by electric field induced poling. Other types of periodic nonlinear coefficient patterning may be employed. Periodic nonlinear coefficient patterning may generally be one of at least two different possible patterns or gratings, for example, (1) a periodic poled pattern of positive and negative nonlinear coefficients or (2) a periodic modulated pattern of either first positive or negative nonlinear coefficients and a second nonlinear coefficient of comparatively low magnitude or of zero magnitude, i.e., no nonlinearity. Electric field induced poling is preferably utilized for NFM device 16 because of its accuracy in forming substantially straight wall domain boundaries in the bulk crystal or waveguide material.

The configuration in FIG. 1B differs from FIG. 1A by the fact that both high power sources 10, 12 are independently tunable sources. Because both sources 10, 12 are tunable, it is possible to extend the tunable mid-IR range from between about 2.0 µm to about 5.0 µm. As an example, tunable source 10 (as indicated by arrow 10A) may be tunable within the frequency range of about 730 nm to about 833 nm, while tunable source 12 (as indicated by arrow 12A) may be tunable within the frequency range of about 1000 nm to about 1150 nm. When these sources are selectively tuned and mixed with their combined output provided to NFM device 16, the full range of selected mid-IR frequencies within the range of about 2.0 µm to 5.0 µm is achievable, within the limits, of course, of the particular absorption edge characteristics of the nonlinear crystal.

FIG. 1C illustrates in graphic form the relative relationship between the pump wavelength, $\lambda_P$, the signal wavelength, $\lambda_S$, and the idler wavelength, $\lambda_I$. For a given tuned pump wavelength, $\lambda_P$, and tuned signal or injection wavelength, $\lambda_S$, such as indicated at "X", an idler mid-IR frequency, $\lambda_I$, can be achieved based on a given periodic poled grating of NFM device 16.

The configurations illustrated in FIGS. 1A and 1B can also be additionally wavelength tuned by means of temperature tuning of the NFM device 16. This is accomplished by controlling the application of heat to device 16 through its submount which changes its resultant mixing frequency. Variation in the uniformly applied heat will vary the frequency mixing response of device 16.

The configuration in FIG. 1D is different from the configuration of FIGS. 1A and 1B in that a second source for the second wavelength beam, $\lambda_2$, is not utilized or necessary. Instead, pumping source 10 having a pumping wavelength, $\lambda_1$, is coupled to NFM device 16 comprising a noncritical, multiple pass, quasi-phase matching (QPM), optical parametric oscillation (OPO) device which may be a crystal or waveguide structure made, for example, from such material as $LiTaO_3$, $LiNbO_3$, KTP, $AgGaS_2$ or $AgGaSe_2$. In the case here, QPM OPO device 16 functions as an oscillator creating within its optical cavity a second shifted wavelength, $\lambda_2$, which is difference frequency mixed with pumping wavelength, $\lambda_1$, to produce an idler wavelength, $\lambda_3$, in the mid-IR frequency range where $1/\lambda_3=1/\lambda_1-1/\lambda_2$. QPM OPO device 16 may be also independently wavelength tuned by means of temperature tuning. A heater may be provided at the submount for device 16. Variation in the uniformly applied heat will vary the frequency mixing response of device 16.

Reference is made to FIG. 2 illustrating pumped mid-IR wavelength source 20 which is a detail embodiment for the FIG. 1B configuration. Source 20 comprises two tunable high power diode laser sources 21 and 22, such as high power, single spatial mode tunable laser diode sources, Model No. SDL-8630, available from SDL, Inc., 80 Rose Orchard Way, San Jose Calif. 95134. The tuned output of these devices, $\lambda_1$ and $\lambda_2$ is combined via folding mirror 26 and dichroic beam combiner 27 and provides as input to NFM device 23 which comprises a QPM DFM waveguide device. The output of laser diodes 21, 22 are individually collimated by respective lenses 24 for presentation to half wavelength plates 25 for rotating the polarization axes of the output beams to be aligned when they are combined at beam splitter 27. Lens 24 may be a lens system to correct for astigmatism in the laser source output depending upon the type of laser source employed. Such lens systems are disclosed in U.S. Pat. No. 5,321,718, assigned to the assignee of this application and is incorporated herein by reference thereto. The output of beam splitter 27 is focused to an input face of waveguide 23 by means of focusing lens 28. Waveguide 23 is periodic poled crystal of $LiNbO_3$ having a poled grating period that is adapted to mix the combined wavelengths $\lambda_1$ and $\lambda_2$ from beam splitter 27. The idler output 31 comprising idler wavelength, $\lambda_3$, in the mid-IR frequency range from waveguide 23 is collimated by lens 29, e.g. a $CaF_2$ lens. Periodic poled $LiNbO_3$ in both bulk and waveguide form are known in the art, one such example being discussed in U.S. Pat. No. 5,295,218, incorporated herein by reference thereto. Wavelength discriminating beam splitter 310 may be a Ge filter employed to absorb any remaining near IR wavelengths from sources 21 and 22 that have not mixed in waveguide 23 or a dichroic beam splitter so that beam 31 is substantially a wavelength selected mid-IR frequency which may be used in an IR application as collimated or focused to a spot as required. Mid-IR source 20 may be optimized by employing optical isolators between each of the lenses 24 and plates 25.

An important aspect of this embodiment is that laser diode sources 21, 22 may be selectively tuned to a wavelength in a near-IR frequency range to provide two closely spaced near-IR wavelengths which are at least a 10 nm in wavelength difference so that they can be appropriately mixed in QPM DFM waveguide 23 via an appropriately selected poling period to produce a desired idler wavelength in the mid-IR range. As a specific example, laser diode sources 21, 22 may be respectively tuned to generate a wavelength about 780 nm and about 980 nm to produce a tunable mid-IR wavelength output 31 in the range between about 3.0 µm to 4.5 µm.

$LiNbO_3$ crystal 23 is periodically poled, preferably employing electric field induced poling, which will be discussed in greater detail later. For example, a grating having a 21 µm period electrode stripes is prepared along the crystal y-direction on the +z face of 0.5 mm thick crystal wafer. With the application of a electric field poling by means of applying electrical pulses, a domain inversion pattern can be created that is 7.8 mm long, having a 40% duty cycle. Thus, with a 21 μm poling period at crystal 23, tuning the signal laser diode wavelength, $\lambda_2$, between about 958 nm and 990 nm, the pump laser diode has optimal phase matching between about 776.7 nm and 781.1 nm, resulting in a mid-IR tuned wavelength in the range between about 3.6 μm and 4.3 μm, as seen from the data results set forth in FIG. 7. The tuning curve for an output idler power at 3.9 μm for this described arrangement is shown in FIG. 3 for $\lambda_2$=972 nm; pump power, $P_P$,= 250 mW; and signal power, $P_S$,=530 mW. As indicated above, the pump wavelength range is relatively small, falling between 776.7 nm and 781.1 nm, with FWHM at about 2.2 nm with the signal wavelength tuned at 972 nm. In FIG. 4, the idler power to signal power is shown where the pump wavelength, $\lambda_P$, is 777 nm, the signal wavelength, $\lambda_S$, is 980 nm, the idler output wavelength, $\lambda_I$, is 3.75 μm, and the pumping power is 180 mW. A power of 7.1 μW has been achieved for an idler output wavelength of 3.9 μm. The dependence of the idler power at 3.75 μm on the incident signal power demonstrates a maximum generated mid-IR output power of 6 μW. With 180 mW of pump power, the slope efficiency of the idler power with respect to the signal power is 1.4×10$^{-5}$, which corresponds to an overall conversion efficiency of 0.008%/W, which corresponds to a material conversion efficiency of 0.015%/W-cm when AR coating are applied to the input and output surfaces of crystal 23. Higher powers can be generated over a larger range of mid-IR wavelengths by employing a longer LiNbO$_3$.

These conversion efficiencies are comparable to conversion efficiencies in AgGaS$_2$ crystals employed as for waveguide 23. However, AgGaS$_2$ crystals are more limited in the handling wider ranges of pumping wavelengths compared to LiNbO$_3$ crystals. In this connection, reference is made to FIGS. 5 and 6 which respectively show the noncritical phase matching characteristics for AgGaS$_2$ crystals and for periodically poled LiNbO$_3$ crystals relative to the pump/signal wavelengths versus mid-IR DFM wavelength for a 21 μm poled pattern. Curve A in FIGS. 5 and 6 relates to the signal wavelength, $\lambda_2$, variation and curve B in FIGS. 5 and 6 relates to pump wavelength, $\lambda_P$, variation. It can be seen from these curves that the tunability for LiNbO$_3$ crystals is superior to that for AgGaS$_2$ crystals in that comparatively smaller tuning wavelength changes for either or both of the pump or signal wavelength to achieve a fairly broad range of selectable mid-IR wavelengths as previously mentioned. Thus, LiNbO$_3$ crystals are useful for mid-IR QPM DFM with efficiencies comparable to AgGaS$_2$ crystals but provide for a much wider freedom of pumping wavelength and greater versatility in wavelength selectability for mid-IR wavelengths, as illustrated in FIG. 7, particularly extending out to the material absorption edge of LiNbO$_3$ crystals to mid-IR wavelengths at 4.5 μm to 5.0 μm.

The foregoing discussion relative to FIG. 2 has been related to laser diode sources 21, 22 comprising tunable laser diode sources. Such tunable sources can be of the type that include an external optical cavity with a rotatable reflecting mirror that provides either first order or second order light into an oscillator or amplifier device such as exemplified in U.S. Pat. No. 5,392,308, which is incorporated herein by reference thereto. Alternatively, these two sources may also be distributed Bragg reflector (DBR) laser diodes having pump and signal or injection wavelengths that are mixed in waveguide 23 to generate over 100 μW of mid-IR at a chosen mid-IR wavelength in the range between about 2.0 μm to 4.0 μm. Such a system 20 can operate at room temperature and can be produced at a lower cost compared to cryogenic mid-IR laser diode systems and, further, is suitable for packaging on a single substrate.

The tunability of DBR laser diodes 21, 22 may also be accomplished by means of temperature and current tuning, i.e., heating the diodes or varying their current density to cause changes in operating temperature and injection current which in turn causes changes in their wavelength output. This method of wavelength tuning allows for controlled change of the pumping and signal wavelength over several nanometers to produce a mid-IR wavelength at waveguide 23 that is in the range between about 2.0 μm to 4.0 μm. Although the mid-IR range of wavelengths is less than in the case of employing tunable laser diode sources, small range of pump and/or signal tunability provides a comparatively large mid-IR wavelength range of tunability when employing LiNbO$_3$ crystals, as based upon the data shown in FIGS. 5 and 6.

Reference is now made to FIG. 8 which illustrates a more detailed system of the FIG. 1D configuration comprising a pumped mid-IR wavelength source 32. Here, only one laser diode source, i.e., pumping source 33, at wavelength, $\lambda_1$, is required since the mixing signal wavelength is generated in the QPM OPO waveguide 35 which functions as an oscillator via high reflecting (HR) input/output deposited or coated surfaces 36A and 36B, internally generating a second wavelength, $\lambda_2$, while mixing with the pumping wavelength, $\lambda_1$, to produce an idler wavelength, $\lambda_3$, at 37. The parametric gain at the second wavelength, $\lambda_2$, must be balanced with the losses due to the necessary output reflectivity and internal losses of the resonator of OPO waveguide 35. The condition for parametric oscillation threshold is given by the equation, $$\eta P_P L = 2[\alpha L + \ln \cdot 1/R],$$

where η is the normalized conversion efficiency, $P_P$ is the pump power, L is the length of the waveguide, α is the linear loss, n is the refractive index of LiNbO$_3$, and R is the reflectivity of the mirrors 36 at the second wavelength, $\lambda_2$. Typical parameters are L=1 cm, α<0.05 cm-1, η=0.015%/W-cm with reflective coatings 56A and 36B of R=98%, the pumping power required is approximately 1 W. The OPO threshold power can be further reduced by a factor of two by reflecting the pumping power exiting from output 37 of waveguide 35 back into the waveguide with an appropriate external resonator mirror, in lieu of mirror 36B, to reflect the pumping wavelength, $\lambda_1$, back into the device optical cavity. However, such a resonator mirror is transparent to the idler wavelength, $\lambda_3$.

The structure of pump source 33 comprises a monolithic master oscillator power amplifier (M-MOPA) comprising a flared amplifier 33A and a master oscillator 33B with cavity Bragg reflectors 33C. Master oscillator may be slightly tapered away in the direction away from flared amplifier 35A, which concept is disclosed, in part, in U.S. Pat. No. 5,392,308, except that the slight taper in oscillator 33B in the case here extends from rear facet to the inner end of flared amplifier 33A. The slight taper is shown exaggerated in FIG. 8. The purpose of the slight taper, which may be a few degrees, e.g., one to eight degrees, from the axial alignment of the optical cavity, is to provide for good coupling of light into flared amplifier 33A and to increase the beam divergence in this region while still providing good waveguiding properties in oscillator 33B.

The structure of waveguide 35 may be identical to the structure of waveguide 23 in FIG. 2 except, as previously indicated, waveguide 35 is provided with reflecting surfaces to function as an oscillator. The QPM LiNbO$_3$ waveguides are provided with an alternated, poled pattern 38 which is thereafter provided with a waveguide stripe region 39 functioning as a waveguide for propagating radiation provided as input at HR surface 36A, and is formed by an annealed proton exchange resulting in high conversion efficiency for mid-IR wavelengths compared to the use of bulk ferroelectric waveguides. The tight confinement of the interacting modes of the lightwaves increases the intensity as well as the nonlinear conversion efficiency in waveguide 39.

Moreover, a further improvement of the conversion efficiency of the waveguide region 39 can be realized by reducing the refractive index asymmetry of this region. The annealed proton exchanged stripe 39 provides for a higher index region for the propagating light compared to the bulk LiNbO$_3$ cladding material (n=2.2) below the guide and air (n=1) for the upper cladding. This asymmetry of the waveguide region 39 requires forming a deep buried proton exchange in order to adequately support the generation of mid-IR modes generated by the difference frequency mixing (DFM) and resulting in a waveguide that supports many modes at shorter near-IR wavelengths of the pumping source. This strong guiding support is because of waveguide region 39 providing for a more symmetric refractive index profile and, consequently, a more efficient nonlinear frequency conversion. In the case of frequency conversion for DFM where there is a large difference between the pump and idler wavelengths, waveguide 35 must be designed so that the longer idler wavelength radiation can be efficiently guided. When this situation is achieved, the waveguide is typically multimode at both the pump and signal wavelengths. For every triplet of modes, there is a unique phase-matching period and conversion efficiency, the latter of which is calculated from the field profiles for each mode. From these calculations, it has been determined that there may typically be over twenty guided modes at the pump wavelength and six guided modes at the signal wavelength. Since only one mode pair phase matches to generate a mid-IR idler wavelength, the conversion efficiency is reduced to roughly 1 over 100 of the theoretical maximum because the power from the input beams from the laser diode source is split into many modes that can be formed in the waveguide region 39 with little discrimination in their coupling.

The combination of this multi-mode generation and the additional reduction in frequency conversion efficiency brought about by poor modal overlap are due to the asymmetrical waveguide having cladding regions with unequal indices.

As shown in FIG. 9, a cross section of a LiNbO$_3$ waveguide 40 is shown which comprises bulk crystal region 41 within which is formed waveguide region 42, and over which is formed LiNbO$_3$ cladding region 43. As a result, waveguide region 42 for propagating radiation is formed below the surface of the waveguide structure so that it is possible to eliminate the potential cutoff of longer wavelength idler modes while maintaining all three wavelengths (pump, signal and idler) within waveguide 42 nearly single mode, as graphically indicated in FIG. 9 by the mode waveforms, wherein the three modes are substantially symmetrical within waveguide 42. With buried waveguide region 42 being more symmetrical, the waveguide modes will be fewer and more substantially overlap each other yielding a higher normalized conversion efficiency. By utilizing the optimized buried waveguide shown in FIG. 9, normalized conversion efficiencies of at least about 25%/W for a 1 cm crystal can be achieved, which is about two orders of magnitude higher than that attainable with bulk crystal phase matching.

Cladding region 43 in FIG. 9 is fabricating by following the annealed proton exchange process to reverse exchange lithium for hydrogen in the upper portion of formed waveguide region 42 creating a lower index region 43 above waveguide region 42. The process is carried out as follows. First, domain inversion pattern, such as pattern 38 in FIG. 8, is performed by patterning a layer of titanium on a LiNbO$_3$ wafer surface. Next, the pattern is diffused into the crystal by means of furnace annealing, utilizing a diffusion temperature near the crystal Curie temperature. Next, a deep proton exchange profile is formed by proton exchange in molten benzoic acid followed by annealing. Next, the upper surface region of the formed waveguide is subjected to reverse exchange to bury the proton exchanged LiNbO$_3$ waveguide. This is accomplished by introducing Li ions into the surface region by means of a melt mixture of KNO$_2$:NaNO$_3$:LiNO$_3$ in the ratio, for example, of about 1:1:0.1 which is applied to the surface of the formed waveguide. The KNO$_2$/NaNO$_3$ mixture functions as carrier for the LiNO$_3$ and the mixture is heated to near their eutectic point of the mixture which is lower than the melting point of the incorporated nitrates per se. In spite of the use of high temperatures, there is no damage to the underlying proton distribution in waveguide 42 below this surface treatment since the restoration of surface cladding region 43 occurs in a short period of time compared to the initial anneal proton exchange process used to form waveguide 42.

An alternative approach to forming buried LiNbO$_3$ waveguides is overcoating the waveguide surface with a dielectric material index matched to bulk LiNbO$_3$, e.g., by depositing a dielectric film or by optical contacting of a polished z-cut LiNbO$_3$ wafer portion to the waveguide surface. Such a dielectric film will need to be fairly thick, such as around 1 μm, and very accurately matched to the refractive index of LiNbO$_3$ to substantially reduced the number of modes in the waveguide. Optical contacting with another LiNbO$_3$, wafer portion requires careful surface preparation. As a further alternative, the Li reverse exchange region 43 may be overcoated with a dielectric coating material having a refractive index accurately matched to the refractive index of LiNbO$_3$.

An alternative approach to forming the periodic poling by means of titanium diffusion is electric field poling to achieve QPM. Electric field poling is accomplished by depositing a periodic pattern of conductive electrodes or the use of planar liquid electrodes on an insulative periodic pattern formed on either the +z axis or −z axis surface of the LiNbO$_3$ crystal, having a period that matches the QPM period. After the electrode patterns are applied to these surfaces, then high voltage pulses are applied across the electrode sets, domain reversal occurs in regions of the applied high voltage pulses. The range of the applied electric field falls with several kV per cm to several 100 kV per cm. Domain reversal occurs through the entire crystal wafer so that substantially straight, vertical domain boundaries in the z plane are obtained so that the full crystal volume can be employed for nonlinear interaction. The patterned high voltage field is applied at room temperature across the crystal. The processing of E-field poling is disclosed in the articles of Jonas Webjorn et al., Quasi-Phase-Matched Blue Light Generation in Bulk Lithium Niobate, Electrically Poled via Periodic Liquid Electrodes, *Electronic Letters*, Vol. 30(11), pp. 894–895, May 26, 1994 and "Electric Field Induced Periodic Domain Inversion in Nd$^{3+}$-Diffused LiNbO$_3$", *Electronic Letters*, Vol. 30(25), pp. 2135–2136, Dec. 8, 1994, and L. E. Myers et al., "Quasi-Phase-Matched 1.064-μm-Pumped Optical Parametric Oscillator in Bulk Periodically Poled LiNbO$_3$", *Optics Letters*, Vol. 20(1), pp. 52–54 (Jan. 1, 1995), which are incorporated herein by reference thereto.

A DFM rare earth doped, periodic poled nonlinear crystal material functioning as rare earth doped oscillator may be employed using the waveguide architecture of device 35. In this case, a single laser diode pump source provides wavelength, $\lambda_1$, and device 35 would be a rare earth doped nonlinear material, such as $LiNbO_3$ or KTP doped with $Er^{3+}$, $Nd^{3+}$, $Yb^{3+}$, $Pr^{3+}$, or $Tm^{3+}$, and is periodically poled, such as by means annealed proton exchange, titanium diffusion or E-field poling. Rare earth doped oscillator 35 is provided with reflectors 36A and 36B at the input and output surfaces or may have reflectors positioned in an external optical cavity forming an external resonator. The input pump beam is partially converted to a longer wavelength by pumping the rare earth doped oscillator. The unabsorbed pump radiation wavelength within the rare earth doped oscillator 35 then difference frequency mixes within the crystal with the internally generated longer radiation wavelength to generate even longer radiation wavelength. The generated longer wavelength is internally reflected within the crystal due to the reflector coatings, which are chosen to provide high reflectance for such longer wavelengths. The periodic poling period is chosen so as to (quasi-phase match the DFM interaction. Examples of representative wavelength interactions for mid-IR wavelengths, for example, useful in spectroscopy are shown in Table 1 below.

TABLE 1

| Dopant | Pumping Wavelength, $\lambda_1$, Range | Rare Earth Doped Lithium Niobate Lasing Wavelength | Mid-IR Wavelength Output |
| --- | --- | --- | --- |
| $Nd^{3+}$ | 805 m–810 nm | 1060 nm | 3.3 $\mu$m–3.4 $\mu$m |
| $Yb^{3+}$ | 910 nm–920 nm | 1120 nm–1150 nm | 4.3 $\mu$m–5.2 $\mu$m |
| $Tm^{3+}$ | 1120 nm–1200 nm | 1600 nm | 3.7 $\mu$m–4.8 $\mu$m |
| $Er^{3+}$ | 980 nm | 1520 nm–1580 nm | 2.6 $\mu$m–2.8 $\mu$m |
| $Pr^{3+}$ | 1010 nm–1020 nm | 1290 nm–1330 nm | 4.2 $\mu$m–4.4 $\mu$m |

Reference is now made to the embodiment shown in FIG. 10 comprising a pumped mid-IR wavelength source 50, which is an example of the FIG. 1A configuration. Source 50 comprises a cw or modulated signal source 51 with a substantially fixed wavelength output, a tunable pumped source with an adjusted wavelength output, and a NFM device that also provides for wavelength tuning. This wavelength tuning may be accomplished by changing the effective poling period of the nonlinear device by means of stage translation of the crystal laterally of the input beam path or by temperature tuning of the NFM device 16 by means of applying heat to the submount of the device. Transverse translation can be accomplished either by minute servo translation of the crystal in a path perpendicular to the axis of the input beam or by slight rotation of the crystal relative to the axis of the input beam.

In particular source 50 comprises a tunable laser source 51 which has, together with necessary optics 51C and mirror surface 51D, an external cavity with a rotatable mirror 51A for selecting a particular wavelength, $\lambda_1$, under lasing conditions in conjunction with associated gain element 51B comprising a semiconductor amplifier, e.g. a flared gain section 51G of the type disclosed in U.S. Pat. No. 5,392,308 with appropriate output optics 51E. As an example, tunable laser diode 51 may have a tunable wavelength, $\lambda_1$, range between 775 nm and 900 nm providing an output of about 1 W. Fixed diode laser source 52 comprises a monolithic master oscillator power amplifier (M-MOPA) having a gain section 52A providing feedback by means of DBRs 52D, a modulator section 52B for providing frequency or pulse modulation, and a flared or tapered amplifier section 52C for providing high gain providing a collimated output via appropriate output optics 52E. For amplitude modulation, modulator section 52B would not be employed or would be eliminated. As an example, M-MOPA 52 may have an output wavelength, $\lambda_2$, of about 1000 nm to 1100 nm providing output power at 1 W. Wavelength beams, $\lambda_1$, $\lambda_2$ are combined by dichroic beam combiner 53 and are presented as a focused beam input, via lenses 55, to NFM device 54.

Because M-MOPA 52 has an integrated phase modulator, the DFM source 50 has particular application for highly sensitive FM spectroscopy. The stable spectrum and single diffraction limited spatial mode output from both high power, near-IR laser devices 51 and 52 results in high conversion efficiency and narrow linewidth mid-IR wavelengths.

NFM device 54 is a QPM DFM crystal, e.g., $LiNbO_3$, with a periodic poled pattern 59 formed on its +z surface by, for example, electric poling, as previously explained. However, the formed pattern is in a fan-shape about an arc that has a center of origin to left of the plane of FIG. 10 so that poled pattern 59 is fanned out toward the right of FIG. 10 with equally spaced, reversed poled domains. The periodic domain inversions of pattern 59 may tie, for example, of 0.5 mm widths and the period of inversion may increase by 1 $\mu$m in the –y direction due to the fanning out of the domains. Periodic poling of the $LiNbO_3$, crystal is preferably accomplished by means of electric field poling in the manner as previously explained because this type of poling is best suited for forming fan shaped electrodes in order to carry out the poling process. The domain inversions extend from top to bottom between the z crystal faces and the width of the poling period varies slowly along the x axis of the crystal. As an example, the periods or the crystal may vary from about 20 $\mu$m to 24 $\mu$m along the x axis. Upon crystal lateral translation in the x direction, indicated by arrow 58A, by means of servo motor control 58, generating mid-IR wavelengths between about 2.6 $\mu$m to 4.4 $\mu$m, given the adjusted and fixed wavelengths $\lambda_1$, $\lambda_2$ and possibly limited at the longer wavelength end of the mid-IR range spectrum by material absorption edge. However, by translation of crystal 54 perpendicular to the beam propagation path, i.e., the crystal x direction, by means of servo motor control 58 in combination with the wavelength tuning of the pumping wavelength via only one of the laser sources 51, phase matching can be achieved over a broader range of mid-IR frequencies, i.e., between about 2.6 $\mu$m to 5.0 $\mu$m. This is an important aspect of this invention in that tuning range requirements in utilizing a near-IR pump laser is greatly narrowed in covering a broad mid-IR range of selectable wavelengths, particularly when compared to noncritical birefringent phase matching where both wavelength inputs must be tuned together.

Frequency mixing occurs within device 54 so that at its output, via Ge filter 57, is a mid-IR wavelength within the tunable mid-IR range of about 2.6 $\mu$m to 5.0 $\mu$m based upon the above mentioned pump and signal wavelengths, $\lambda_1$, $\lambda_2$. Ge filter 57 absorbs any remaining, unmixed near-IR wavelengths and is transparent to the mid-IR wavelengths, $\lambda_3$.

As a specific example, a tunable laser pump source 51, such as Model No. SDL-8630, may be utilized having a tunable frequency range of 770 nm to 790 nm at 330 mW output. M-MOPA signal device 52 may have a wavelength of 1013.3 nm with a power output of 625 mW and with device 51 tuned at 779.8 nm with output power at 325 mW, the peak of the tuning curve across the pump wavelength band generates a mid-IR idler wavelength, $\lambda_3$, from crystal device 54 of 3.38 nm with FWHM equal to 1.1 nm. Device 54 in the case here has an adjusted 21.1 μm poling period and is at 23° C. The actual poled interaction length was 11 mm. The frequency conversion efficiency from near-IR to mid-IR wavelength was 0.011%/W, and a peak power of 22 μW was generated at 3.38 μm. Correcting for Fresnel reflections, the actual frequency conversion efficiency in crystal device 54 was 0.017% W. By translating device 54 perpendicular to the beam propagation direction, phase matching was obtained at wavelengths between 3.34 μm and 3.57 μm. The poling period varies, via such lateral translation in the x direction, from 21.0 μm to 21.5 μm for achieving these mid-IR wavelengths. It should be understood that the upper mid-IR wavelength was limited in this particular example by the tunable capability of laser source 51 so that longer mid-IR wavelengths can be achieved with a source 51 having longer tunable wavelength capability.

As previously indicated, temperature changes to device 54 can be effectively applied to generate different mid-IR wavelengths. The phase matching wavelength for changes in wavelength at source 51 changes with changes in the temperature of device such that the generated mid-IR wavelength for each 0.1 μm change in the poling period is 0.046 μm. Continuous tuning by non-critical phase matching over the mid-IR range can be achieved by temperature tuning over the employment of only a 30° C. temperature range. As an example, using a poling period at 21 μm with a signal wavelength at 1013.3 nm where dλ/dT is equal to 0.00155 μm/° C., at 23° C., the mid-IR wavelength was about 3.34 μm; at 40° C., the mid-IR wavelength was about 3.365 μm; and at 55° C., mid-IR wavelength was about 3.39 μm.

FIGS. 10A and 10B show alternative forms of changing the effective poling period of device 54. In FIG. 10A, NFM device 54 is rotated about a central axis 54', as indicated by arrow 54R, to change the effective poling period of domains 54". Alternatively, the axis of rotation need not be central, but can be slightly offset from central axis 54. Also, an effective linear change of the nonlinear period of device 54 can be accomplished by slight rotation of device 54 in z direction about axis 54' concurrently with rotation the of device 54 in the y direction about an axis perpendicular to axis 54'. In FIG. 10B, NFM device 54 comprises a plurality of parallel waveguide stripes or regions 54A–54D each with a different pattern pitch. For example, the period for section 54A may be 20 μm, for section 54B may be 21 μm, section 54C may be 23 μm and section 54D may be 24 μm. Device 54 is laterally translated by servo motor control 58 to align any one of sections 54A, 54B, 54C and 54D within the optical path of input beam of wavelengths $\lambda_1$, $\lambda_2$. The poling patterns of FIG. 10B have been exaggerated for purposes of illustration. It is preferred that the pattern of periods of FIG. 10B be formed by means of electric field poling since this process can be easily applied to such a structural arrangement except that, in this case, the electrode pattern is formed as a plurality of electrode rows of different pitch on both z faces of the crystal device 54.

Reference is now made to FIGS. 11 and 12, which illustrate another embodiment for either the FIG. 1A or FIG. 1B configuration, comprising mid-IR wavelength source 60 utilizing a high power, laser source pumped, double-clad fiber amplifier 69 which provides a high power beam at wavelength, $\lambda_1$, to NFM device 64.

An example of the type of optical double clad fiber useful for fiber amplifier 69 is illustrated in cross section in FIG. 12, although other double clad configurations may easily be employed. Fiber 69A comprises a core 69B, inner cladding 69C and outer cladding 69D. Core 69B may be a single mode fused silica core having a diameter of 5–6 μm and may be doped or co-doped with rare earth ions, such as $Nd^{3+}$, $Yb^{3+}$ or $Er^{3+}$. Core 69B is surrounded by substantially rectangular shaped undoped silica inner cladding 69C which, in turn, is embedded in a low refractive index polymer outer cladding 69D. This configuration allows for a large numerical aperture of up to 0.6 for pump radiation captured by polymer inner cladding 69C. The rectangular geometry fosters maximum overlap of propagating modes in inner cladding 69C with doped core 69B. By coupling the radiation from high power, multimode laser diode pump source 65 into inner cladding 69C and the radiation from single mode injection source 66A into core 69B, double-clad fiber 69A functions as a high power amplifier, preserving the temporal and spectral properties of the injection or signal source beam in a single spatial mode output to NFM device 64. As an example, double-clad fiber amplifier 69A doped with $Nd^{3+}$ may provide an output at 1.06 μm, or doped with $Yb^{3+}$ may provide an output at 1.1 μm, or doped with $Er^{3+}$ may provide an output at 1.55 μm. Such near or low end IR generation would improve the frequency conversion efficiency for longer mid-IR output from NFM device 64, such as above about 4.4 μm, which is approximately the absorption edge for $LiNbO_3$, dependent upon its optical properties. Also, the output beam from amplifier 69A is highly stable over time, can operate under adverse operating conditions, and has a near Gaussian, diffraction limited mode with $M^2$ measured at approximately 1.1 which is better than that achievable from rod or YAG lasers. The availability of this large pumping bandwidth removes many constraints on the operating temperature of laser source 65A, resulting in a more efficient and compact system. In addition, the large pump bandwidth of $Yb^{3+}$ doped fibers permits the use of wavelength multiplexing of pump lasers for high power efficient operation of double clad fibers. Moreover, the pumping bandwidth of fiber amplifier 69A, particularly $Yb^{3+}$ doped fibers, is much broader than possible from diode pumped rod or YAG lasers. Lastly, the fiber geometry of FIG. 12 provides long propagation distance for absorption of the pump light resulting in high absorption of the pump beam even if the wavelength of the pump beam is slightly off of the gain peak of the rare earth doping of fiber amplifier 69A. Referring again to FIG. 11, mid-IR wavelength source 60 comprises high power injection source 61 for providing a high power, fixed pumping near-IR wavelength, $\lambda_1$, which is combined with another near-IR wavelength, $\lambda_2$, from tunable pump source 62 via dichroic beam combiner 63 for input to NFM device 64. In this connection, the configuration of FIG. 11 is substantially similar to the configuration of FIG. 1A except for the application of source 61. If pump laser source 65A in injection source 61 is changed to a tunable device, such as device 51 in FIG. 10, then the configuration of FIG. 11 would be substantially similar to the FIG. 1B configuration where pump source 62 is also a tunable source.

Injection source 61 comprises multimode pump laser 65A for providing wavelength, $\lambda_P$, which is combined, via beam combiner 67A, with the output from injection laser diode 66A, which may be cw or pulsed, providing injection wavelength, $\lambda_I$. As an example, pump laser 65A may be comprise a of a high brightness, quasi-cw laser diode bar, and injection laser 66A may be a DBR laser diode having a gain peak near that of rear-earth doped fiber 69A. A diode bar for source 65A provides a multiplicity of pump sources, such as 16 or more per bar and the possibility of employing multiple such bars, so that failure of any one or more laser elements in one or more bars does not affect the other operating laser elements or the resulting efficiency of fiber amplifier 69A. As an example, pump source 65A may be a 17 W fiber coupled laser diode bar. Pump source 65A at wavelength, $\lambda_P$, is coupled into the inner cladding 69C of fiber amplifier 69A while injection laser source 66A at wavelength, $\lambda_1$, is coupled into core 69B of fiber amplifier 69A. The injected wavelength is optically coupled, via optical isolator 68, into the core 69B of high power, double-clad rare earth doped fiber amplifier 69A, e.g., a Nd doped double clad fiber.

Pulsed operation of pump source 65A and/or injection source 66A allows a larger pulse energy to be extracted from fiber amplifier 69A in comparison to cw operation. The output of fiber amplifier 69A provides a high power beam at wavelength, $\lambda_1$, e.g., in the range of 1.0 $\mu$m to 2.0 $\mu$m with cw output power as high as 30 W peak power (in the case of double-clad $Nd^{3+}$ doped fiber), or pulsed peak powers of 1 kW or more with pulse frequencies from 100 Hz to greater than 1 GHz. Further increases in power are easily achieved by employing multiple pump sources optically coupled into double-clad fiber amplifier 69A by spatial wavelength and/or polarization multiplexing. By using multiple pump sources, output powers of 10's of watts of average power are possible from a single fiber amplifier 69A.

By pulsing injection laser 66A to a high peak power and low duty cycle, high peak power pulses, such as 1 kW or more, are obtained at the output of double-clad fiber amplifier 69A and injected into NFM device 64 which may be a QPM DFM device, or may be a QPM OPO device, eliminating the requirement of laser source 62 in this latter case. Tunable injection laser source 62 may be pulse modulated.

In the embodiment of FIG. 11, fiber amplifier 69A may, alternatively, be a Raman or Brillouin amplifier requiring no rare-earth doped fiber.

While the foregoing principal embodiment makes preferred use of a high power injection source 61 because of the large power output that it provides for high power applications required for operating NFM devices 64, other high power laser diodes, diode arrays or diode bar arrays may be used in place of injection source 61 if they provide sufficient output power for mid-IR conversion requirements, such as a power output of at least 200 mW.

Reference is now made to other examples, for the configurations for high power injection source 61 which are shown in FIGS. 13 and 14. In FIG. 13, high power injection source 61 comprises a double clad rare-earth doped fiber laser 69B having a feedback mechanism in the form of gratings 69G to bring about lasing conditions. Other components of source 61 are similar to FIG. 11 and the description there is equally applicable to the components here comprising multimode pump laser source 65B. An additional injection laser source 66B, shown in dotted line may possibly be provided, via a beam combiner 67B for example (also shown in dotted line), with its output optically coupled into fiber laser 69B in order to narrow and stabilize the lasing wavelength band to improve the nonlinear frequency mixing conversion efficiency.

Reference is made to FIG. 23 relative to mid-IR wavelength source 150 which is a modification of the high power injection source 61 of FIG. 13. FIG. 23 is the same except that fiber laser 69B is wavelength tunable. As shown in FIG. 23, gratings 69G include wavelength tuning devices 69T. In the case here, a tuning device 69T is shown for each grating although it is possible to employ only one such device. Tuning devices 69T change the properties of the gratings 69G so that the wavelength, $\lambda_1$, in oscillator 69B is changed in order to extend the possible range of mid-IR frequencies that can be generated by device 64. Tuning devices 69T may wavelength tune gratings 89G by stretching the fiber grating (U.S. Pat. No. 5,007,705 to Morey et al.); by compression of the fiber grating (U.S. Pat. No. 5,469,520 to Morey et al.); by thermal variation of the grating (U.S. Pat. No. 5,159,601 to Huber); by employing a piezoelectric transducer (U.S. Pat. No. 5,446,809 to Fritz et al.); by mechanically bending the grating fiber, or rotating the grating relative to the fiber or moving the grating relative to a side-polished region of the fiber (see patents of Sorin et al., such as U.S. Pat. No. 5,058,997); and by opto-electric effect by application of an applied electric field across the grating wherein increasing voltage of the field, such as a negative voltage, causes an increase in the refractive index only in the UV exposed regions forming the grating, shifting the grating reflectivity to longer wavelengths (T. Fujiwara et al. in the paper entitled, "UV-Excited Poling and Electrically Tunable Bragg Gratings in a Germanosilicate Fiber", Postdeadline Paper, pp. PD6-1 to PD6-5, *Optical Fiber Conference '95*, (February, 1995). The patents to Morey et al., Huber, Fritz et al. Sorin et al., and the paper of T. Fujiwara et al. are incorporated herein by reference thereto. An additional injection laser source 66B, shown in dotted line may possibly be provided, via a beam combiner 67B for example (also shown in dotted line), with its output optically coupled into fiber laser 69B in order to narrow and stabilize the lasing wavelength band to improve the nonlinear frequency mixing conversion efficiency.

In FIG. 14, high power injection source 61 comprises a semiconductor amplifier 69C having a tapered gain section 69F producing, for example, a power output greater than 1 W providing for tens to hundreds of milliwatts of near-IR wavelength radiation for frequency mixing.

Any one of the high power sources 61 shown in FIGS. 11, 13 and 14 may be employed in groups, such is in tandem and all optically coupled into the NFM device to increase the power input and efficiency of operation of the NFM device. Also, different of such sources, shown in these respective figures, particularly having tunable capabilities to maintain the same wavelength, $\lambda_1$, may be also employed in such groups. As grouped, this combined source can be employed with respect to any of the embodiments illustrated herein.

FIG. 15 discloses a mid-IR wavelength source 70 utilizing a high power injection source 61 of any one of FIGS. 11, 13 and 14 in combination with a NFM device comprising a QPM OPO device 74. Mid-IR generation based on OPO is a desirable approach because only a single high power source 61 is required and mid-IR average power outputs greater than one watt with broad tunability over a 2.0 $\mu$m to 4.0 $\mu$m wavelength range are possible. The beam output of source 61 at a fixed or tuned wavelength, $\lambda_1$, is optically coupled into OPO resonator 74 via lens system 71 which collects and collimates the beam output from source 61 and focuses the beam as input into OPO device 74. OPO device 74 comprises a periodic poled, bulk $LiNbO_3$ crystal 72 for noncritical phase matching any one of tuned wavelengths, $\lambda_1$, provided from source 61. QPM OPO device 74 includes external cavity focusing mirrors 73 and 75 wherein mirror 73 is transparent to wavelength, $\lambda_1$, but highly reflective of internally developed near-IR wavelengths, $\lambda_2$, created within crystal 72 due to frequency mixing, while mirror 75 is transparent to developed mid-IR wavelengths, $\lambda_3$, and highly reflective of internally developed wavelength, $\lambda_2$, created within crystal 72 due to frequency mixing and partially of wavelength, $\lambda_1$. Frequency mixing results in the development of mid-IR wavelength, $\lambda_3$, radiation beam from QPM OPO device 74.

As in the case of QPM DFM device 54 in FIGS. 10, 10A and 10B, the poling period can be varied laterally across the width of the crystal in the y direction through proper formation of the poling electrodes, such as by electric field poling. By translating crystal 72 perpendicular to the pump beam of wavelength, $\lambda_1$, the mid-IR wavelength from OPO device 74 can be tuned over a broad range of wavelengths, e.g., 2.5 μm to 4.5 μm.

Reference is now made to FIG. 16 discloses the application of a rare earth, single mode, polarization maintaining fiber laser 82 pumped with high power pump source 61 of any one of FIGS. 11, 13 and 14 or with a lower power single spatial mode diode at 100 mW to 200 mW for frequency mixing in mid-IR wavelength source 80. Fiber laser 82 may be polarization maintaining so that both unabsorbed pump radiation and oscillator generated radiation have the same polarization. Polarization maintaining features are provided directly in the fiber 82. Examples of such features are discussed in greater detail below in connection with FIG. 21. Laser 82 includes Bragg gratings or other fiber reflectors 81 and 83 provided in each end of the fiber. Reflector 81 has high reflectivity of generated wavelength, $\lambda_2$, with low reflectivity at pump wavelength, $\lambda_1$; reflector 83 has high reflectivity of wavelength, $\lambda_2$, but sufficiently lower than at reflector 81, to provide for efficient output coupling to NFM device 84, and has low reflectivity for pump wavelength, $\lambda_1$. NFM device 84 is periodically poled for QPM and may be bulk or waveguide $LiNbO_3$, KTP or other appropriate nonlinear material. Input pump beam at wavelength, $\lambda_1$, is partially converted to a longer wavelength, $\lambda_2$, in pumping rare earth doped fiber laser 82. The output from fiber laser 82 is then mixed in NFM device 84 to produce the desired mid-IR wavelength, $\lambda_3$. Fairly critical features for efficient DFM in NFM device 84 are the characteristics in the input beam from fiber laser 82 to have narrow linewidth and proper linear polarization. The fiber comprising fiber laser 82 should also be a single spatial mode fiber for both the pump and lasing wavelengths $\lambda_1$ and $\lambda_2$, so that the two output wavelengths have a similar spatial distribution and can be easily coupled to or focused into NFM device 84 such as by means of butt coupling or by a lens system.

An example of a system 80 for generating a mid-IR wavelength, $\lambda_3$, near 4.3 μm, which may be used in carbon dioxide sensing, comprises a fiber laser 82 with single mode silica fiber doped with Yb. The fiber has grating regions 81 and 83 to insure lasing near 1155 nm and is polarization maintaining and single mode at both of its oscillating wavelength, $\lambda_2$, e.g., 1155 nm, as well as at the pump wavelength, $\lambda_1$, of high power pump source 61, which may have a wavelength near 910 nm. The laser output from fiber laser 82 has a narrow linewidth typically around 1 GHz, and is in the same polarization state as the unabsorbed pump radiation. Representative frequency conversion efficiencies of absorbed pump light to output radiation at 1155 nm is within the range of about 60% to 70%.

For low power mid-IR generation, it is only necessary to convert a small amount, such as a few per cent, of the pump radiation into the longer wavelength, $\lambda_2$, generated by fiber laser 82 before mixing in device 84. Several rare earth doped fiber lasers may be employed in tandem or in parallel each with its high power pump source 61 to provide access for different spectral regions of mid-IR wavelengths thereby covering the entire mid-IR range. The fiber dopants that may be employed in one or more of such parallel coupled fiber lasers 82 may be $Nd^{3+}$, $Yb^{3+}$, $Tm^{3+}$, $Er^{3+}$, and $Pr^{3+}$. Representative wavelength interactions for mid-IR spectros-copy are shown in Table 1 above.

As an alternate embodiment, fiber laser 82 may be co-doped with Er:Yb. The Er:Yb single mode fiber may be pumped with a tunable pump source 61 at 1.06 μm and provide an output $\lambda_3$ of around 1.55 μm with a 50 nm tuning range. The tuning range can be created by source 61 having an external tuning device 51 shown in FIG. 10 or by using an external tuning device with laser 82 such as illustrated at 104 in FIG. 18. Both the 1.06 μm and 1.55 μm beams from laser 82 are employed in device 84 for mid-IR generation. Device 84 may also be either a QPM DFM device or a QPM OPO device.

Devices using Raman scattering or Brillouin scattering may be used in combination with high power source 61 for generating the second mixing wavelength, $\lambda_2$, such as the Raman lasers illustrated in FIGS. 17–20. Laser devices based upon Brillouin scattering are very similar to devices based upon Raman scattering except that Brillouin scattering is based on nonlinear interaction with acoustic phonons whereas Raman scattering is based on nonlinear interaction with optical phonons, these different phonons having different wavelength spacing. In the discussion here, reference will be made generally to Raman lasers using Raman wavelength shift to derive the second wavelength.

Also, in connection with the embodiments of FIGS. 17–20, multiple outputs from Raman or Brillouin lasers or amplifiers can be utilized as a combined input to a NFM device.

In FIG. 17, mid-IR wavelength source 90 employs a Raman laser 92 having multiple sets of Bragg gratings to provide for sequential Raman phase shift orders via grating pairs 91, 93, 95 to produce wavelength, $\lambda_2$, with a sufficiently different wavelength from wavelength, $\lambda_1$, for mixing together in NFM device 94. As an example, three to five orders of phase shifting may be employed. Pump light at wavelength, $\lambda_1$, is provided from high power source 61 as input to Raman laser 92 to produced a second wavelength, $\lambda_2$, due to Raman wavelength shifting within laser 92. This wavelength shifting is accomplished in steps wherein the Raman shift may be represented by $\Delta\lambda$. Grating pairs 95 provide for a first shifting of $\lambda_1+\Delta\lambda$ producing a first intermediate wavelength. Grating pairs 93 provide for a second shifting of $\lambda_1+2\Delta\lambda$ producing a second intermediate wavelength. Grating pairs 91 provide for a third shifting of $\lambda_1+3\Delta\lambda$ producing a finally shifted wavelength, $\lambda_2$. In this connection, grating 91, immediately adjacent to NFM device 94, has low reflectivity at wavelength, $\lambda_2$, as well as wavelength $\lambda_1$. The typical wavelength shift in Raman oscillator 92 for each wavelength shift order may be in the range of 50 nm to 70 nm. Also, there may be up to five orders of phase shifting employing five pairs of gratings to achieve sufficiently large difference in wavelengths, $\lambda_1$, $\lambda_2$, to achieve frequency mixing in NFM device 94. NFM device 94 may be of same design as in the case of NFM device 64 in FIGS. 11, 13 and 14.

Mid-IR wavelength source 100 shown in FIG. 18 is identical to the embodiment shown in FIG. 17 except that source 100 is wavelength tunable with the inclusion of dichroic beam combiner 102 in the beam path from high power source 61 which is transparent to wavelength, $\lambda_1$, but is designed to reflect the second intermediate wavelength developed from Raman laser 92 into an external cavity that includes tuning mirror 104 which may be rotated to change the selected output wavelength, $\lambda_2$, of laser 92 for input to NFM device 94. In this case, grating 91 that is immediately adjacent to NFM device 94 is designed to have low reflectivity at any tuned wavelength, $\lambda_2$ as well as wavelength, $\lambda_1$.

Reference is now made to FIG. 19 illustrating mid-IR wavelength source 110 comprising high power pump source 61 coupled to a polarization maintaining, single mode fiber oscillator 112 for Raman wave shifting a portion of the radiation beam at wavelength, $\lambda_1$, from the pump source to a second wavelength, $\lambda_2$, e.g., a single mode fiber with Bragg gratings 111 and 113 for Raman wavelength shifting. The combined outputs at wavelengths, $\lambda_1$, and $\lambda_2$, from Raman fiber oscillator 112 is provided as input to NFM device 114, e.g., QPM DFM or QPM OPO devices. Output beam from high power pump source 61 is injected into silica fiber 112 wherein gratings 111 and 113 are around the peak wavelength of the Raman gain for the fiber. Typical wavelength shifts in Raman oscilator 112 are in the range of about 50 nm to 70 nm. Multiple Raman orders for larger wavelength shifts have already been described in conjunction with FIGS. 17 and 18. The output from Raman fiber oscillator 112 is coupled into NIFM device 114 for mixing of combined wavelengths, $\lambda_1, \lambda_2$, i.e., is the difference between the Raman shifted beam and the transmitted pump beam from source 61. As an example, high power source 61 utilizing the configuration shown in FIG. 11 (without device 62) may have a tunable wavelength between about 1030 nm to 1090 nm and Raman fiber laser 112 will provide an output at about 1.44 $\mu$m. The resulting tunable mid-IR wavelength range is between about 3.6 nm and 4.5 nm.

In FIG. 19 polarization maintaining single mode fiber 112 is particularly employed in cases where the high power laser beam from high power pump source 61 is unpolarized or has arbitrary polarization. Such is the case for a beam produced from high power pump source 61 utilizing a double clad amplifier 69A as illustrated in FIG. 11. For efficient frequency mixing in a NFM device, such as device 114, polarized light is fairly critical. In principal, double clad fibers can be polarization maintaining to provide a polarized output, as is the case in both FIGS. 16 and 19. Fabrication of a polarization maintaining fiber typically requires a modification in the fiber cladding to achieve asymmetry in the fiber core so that there is a refractive index difference in orthogonal directions. A known example of achieving such asymmetry is called the "bow-tie" fiber. Another type of configuration would be a core that has an elliptical or other irregular shape vis a vis a circular shape. Alternatively, a simple solution for polarizing the output from a double clad fiber or other unpolarized laser source is to pass the output from the laser source through a polarizing filter. However, at least 50% of the light will be lost in such a polarizer. Moreover, changes in the input polarization will cause power or intensity fluctuations to appear in the polarized output which deteriorates the beam quality as applied to NFM device 114, or other such polarized input beam required application, such as, in a xerographic printer image exposure system or in frequency converters, i.e., frequency doubling or frequency difference mixing or sum generation.

Alternative methods may be utilized to efficiently convert an unpolarized beam or an arbitrary polarized beam into an output beam having single, stable linear polarization employing Raman or Brillouin wavelength shifting in a polarization maintain single mode fiber. Thus, in the case of the embodiment of FIG. 19, high power pump source 61 comprises a pump laser diode source coupled to a double clad fiber amplifier doped with a rare earth such as Yb or Nd, as previously illustrated in connection with the embodiment of FIG. 11. The output beam at wavelength, $\lambda_1$, is provided as input to polarization maintaining, single mode fiber 112 having Bragg gratings or other reflectors 111 and 113 at the wavelength of the Raman or Brillouin gain of the fiber. Fiber oscillator 112 provides a polarized Raman or Brillouin shifted output beam. Fiber 112 without reflectors 111 and 113 will function as amplifier and can be provided in the embodiment of FIG. 11 in place of amplifier 69A. The Raman and Brillouin amplifier or oscillator is based on conventional silica fibers and rely on the natural Raman and Brillouin gain in silica fibers. Input reflector 111 has high transmission at the pump wavelength, $\lambda_1$, and high reflection at the Raman or Brillouin gain wavelength, $\lambda_2$. For Raman shifting, the typical difference between pump source wavelength and Raman gain is approximately 70 nm. For Brillouin gain the wavelength shift is in the tens of GHz or sub-Angstrom range. By introducing a small amount of loss in the polarization maintaining, single mode fiber 112 for one of the directional polarizations, the fiber will operate in a single polarized mode providing a polarized output beam. This polarization dependent loss in fiber 112 can be introduced in a number of different ways, such as, by bending the fiber in one direction, reducing one side of the fiber close to the fiber core, or introducing into the body of the fiber or into the reflectors 111 and/or 113 polarization dependent loss mechanisms.

As indicated above, fiber 112 can also be operated as a Raman or Brillouin amplifier by injecting a signal source into an end of fiber 112, as in the case of FIG. 11. Brillouin gain is effective only in one direction, i.e., it is effective only on counter propagating beams in fiber 112 so that the signal from signal source 66A must be injected into the reflector 113 end of fiber 112. Raman gain is effective in both fiber directions, and the input signal may be injected into either end of fiber 112. However, the Brillouin gain in fiber 112 is much higher than the Raman gain, at least two orders of magnitude higher. Therefore, the Brillouin amplifier will operate under cw conditions even at relatively low signal injection powers, such as several 100 mW. To be most effective, the Raman amplifier should be operated with high peak powers. Polarization maintaining silica fiber 112 can be replaced by a polarization maintaining rare earth fiber, such as disclosed and discussed in connection with FIG. 16.

In summary, Raman or Brillouin gain in a fiber may be used to provide either an amplifier or an oscillator. In the case of the amplifier, the input beam, for example, at a wavelength of 1.06 Mm, will overlap with the polarization direction of the fiber gain and provide a polarized output having wavelengths. Such a linearly polarized output would be suitable for use with a QPM DFM nonlinear device such as device 54 in FIG. 10. However, with the use of reflectors 111 and 113, a Raman or Brillouin oscillator is formed providing a fixed polarization output at a shifted wavelength. Such a linearly polarized output of single wavelength would be suitable for use with a QPM OPO nonlinear device such as shown in FIGS. 8 and 15.

In using Raman or Brillouin gain in fiber 112 for providing a linearly polarized output beam to a nonlinear frequency mixing device, there may develop the problem of providing no or little gain if the input pump beam is polarized relative to one of the orthogonal polarization axis of the polarization maintaining fiber 112 whereas the Raman or Brillouin oscillation and amplification was designed along the other orthogonal polarization axis, since Raman and Brillouin gain is polarization dependent. If the input beam has a orthogonal polarization 90° of the polarrzation of the Raman or Brillouin gain in the fiber, the polarization relationship will be maintained in the fiber and the input beam will not overlap with the Raman or Brillouin gain so that no gain will be experience by the input beam. This problem is circumvented by employing polarization converter 120 shown in FIG. 20. Pump beam at wavelength, $\lambda_1$, is provided to fiber 112 which has reflective gratings 111 and 113 at each end of the fiber with reflectivity at the Raman wavelength of the fiber. Fiber 112 can also be employed as amplifier without gratings 111 and 113. The produced dual wavelength output from fiber 112 is collimated by lens 125 and passed through a first wave plate 126 which changes the angle of polarization by a proscribed small amount prior to the reflection of the pump beam wavelength, $\lambda_1$, back into fiber 112 via mirror 124. Mirror 124 has reflectivity for the wavelength, $\lambda_1$, of the pump beam but has low reflectivity for the wavelength, $\lambda_2$, of the linearly polarized Raman amplified beam which is transmitted through mirror 124 to a polarization sensitive application requiring a polarized beam input for optimum performance, such as NFM device 128.

The polarization vector of the reflected pump beam $\lambda_1$ is rotated again by wave plate 126 and reenters fiber 112 at a angular polarization direction different from the original polarization direction which, in the case of originally matching orthogonal beam polarization, will now no longer be present. The returning beam will now be subjected to the overlapping Raman or Brillouin gain of the fiber. As a result, the returning pump beam $\lambda_1$ becomes scrambled along fiber 112 providing uniform gain for any propagating polarized Raman beam within fiber 112.

Wave plate 127 provides for return of the polarization direction of the Raman beam at wavelength, $\lambda_2$, transmitted through mirror 124 to be converted to the proper polarization axis for the particular polarization sensitive application. As an example, wave plates 126 and 127 together must be equal to a ½λ shift to shift the polarization by 90° so that wave plate 126 may, for example, be ⅛λ while wave plate 127 is ⅜λ or ⅜λ+nλ.

FIG. 21 is another polarization converter 130 operative in a manner similar to polarization converter 120 of FIG. 20 except that wave plates 126, 127 are replaced with two short sections of polarization maintaining fibers 132, 134 having the same functionality as wave plates 126, 127. Fibers 132, 134 are spiced or otherwise optically coupled to each other at 139 and to fiber 112 at 138 to provide for efficient beam coupling and a more compact configuration. Fiber 112 has a polarizing maintenance feature or mechanism such as the bow-tie configuration shown at 135 in FIGS. 21A–21C. The angular orientation of the feature is indicated by dotted line 136A which corresponds to the polarization direction of the fiber gain.

Short coupled fiber 132 has a reflective device 133 formed at its forward end which may be a Bragg reflector or other fiber reflector. Reflective device 133 is reflective of the pump wavelength, $\lambda_1$, of the pumping beam but transmits the Raman or Brillouin gain wavelength, $\lambda_2$. However, the orientation 136A of bow-tie configuration 135 for fiber 132 is different, as shown in FIG. 21B, so that any polarization axis of the pump beam that is substantially orthogonal with the polarization axis of fiber 112 will be slightly rotated by the difference in angular orientation between orientations 135A and 136B shown in FIGS. 21A and 21B. As a result, such polarized input light will be subject to the gain of fiber 112. Fiber 134 functions similar to wave plate 127 in that the Raman or Brillouin output beam is changed to the original polarization orientation 136C, shown in FIG. 21C, designed for the particular application to which the beam is to be applied. In other words, the orthogonal relationship of proper polarization direction is maintained for the output beam, $\lambda_2$. As an example, fiber 132 may have a ⅛λ shift so that fiber 134 must provide a ⅜λ shift to place the output beam with a proper orthogonal polarization orientation 137A.

It will be understood by those skilled in the art that any asymmetry producing strain in the fiber in a transverse orthogonal direction of the fiber optical axis is sufficient to control beam polarization including the above mentioned bow-tie configuration. Such asymmetry causes losses to the pump beam but in the case of rare-earth doped fiber laser, the fiber core can be Er:Yb co-doped to increase amplification efficiency, or, in the case of a Raiman laser, the core may be doped with Ge in high concentration to increase amplification efficiency.

Mid-IR source 140 shown in FIG. 22 is a derivation of any one of FIGS. 11, 13 or 14 and the description relative to FIG. 11 of like components with the same numerical identification is equally applicable to source 140. However, source 140, in addition, includes an Er:Yb doped, single mode fiber amplifier 142 for receiving the pump beam from high power pump source 61. Co-doped fiber amplifier 142 provides for an increase in the pumping bandwidth of the propagating beams formed in fiber 142 of wavelengths, $\lambda_1$ and $\lambda_2$, by employing co-dopants so that the overall mid-IR bandwidth of tunable frequencies, via tuning signal source 62, is correspondingly increased. As an example, if $\lambda_1$ is 1.06 μm, the output of amplifier will be at wavelengths 1.06 μm and $\lambda_2$ equal to 1.55 μm ±30 nm. Thus, the wavelength difference of approximately 40 nm to 50 nm between $\lambda_1$ and $\lambda_2$, is sufficient for mixing in NFM device 64, which in the case here is preferably a QPM DFM device. Tunable laser diode 62 can adjust the range of wavelength difference thereby further broadening the range of achievable mid-IR wavelengths that can be obtained from NFM device 64.

An alternative modification for source 140 is the use of Bragg reflectors 144 and 145 at the ends of fiber amplifier 142 to provide an oscillator and provide a single modified output wavelength, $\lambda_2$, for NFM device 64, which in this case is preferably a QPM OPO device. Tunable laser diode 62 would, therefore, not be used in this alternative modification. As an example, if the wavelength, $\lambda_1$, of output beam from source 61 is 1.06 μm, the output beam from oscillator 142 would have a wavelength, $\lambda_2$, of about 1.55 μm. A further modification of this alternative is to employ a frequency tuning mirror, such as shown at 104 in FIG. 18, in the location of tunable laser diode 62 so that the oscillator cavity for fiber oscillator 142 would include beam combiner 63 and the additional frequency tuning mirror. In this manner, the output wavelength, $\lambda_2$, could be varied so that the range of possible mid-IR wavelengths from device 64 can be extended. In the case where source 61 is pulsed, a 30 watt peak power is possible where optical fiber 142 is Nd doped.

Relative to the alternative form for source 140 discussed in the previous paragraph, it should be understood that that oscillator 142 with gratings 144, 145 may also be tunable for producing the second wavelength, $\lambda_2$, of desired frequency so that the mid-IR range of the NFM device can be extended. This is illustrated in FIG. 24. Mid-IR wavelength source comprises a rare-earth doped fiber oscillator or a Raman or Brillouin oscillator 161 having Bragg gratings 162G formed at the fiber ends to form an oscillator cavity. Oscillator 161 is pumped by high power source 61 and the period of gratings 162G are designed to produce a shifted wavelength, $\lambda_2$, for presentation with the pump wavelength, $\lambda_1$, to NFM device. Pump source 61 may be a fixed or tunable wavelength and oscillator 161 is tunable by means of tuning devices 162T. Tuning devices 162T may wavelength tune gratings 162G by stretching the fiber grating (U.S. Pat. No. 5,007,705 to Morey et al.); by compression of the fiber grating (U.S. Pat. No. 5,469,520 to Morey et al.); by thermal variation of the grating (U.S. Pat. No. 5,159,601 to Huber); by employing a piezoelectric transducer (U.S. Pat. No.

5,446,809 to Fritz et al.); by mechanically bending the grating fiber, or rotating the grating relative to the fiber or moving the grating relative to a side-polished region of the fiber (see patents of Sorin et al., such as U.S. Pat. No. 5,058,997); and by opto-electric effect by application of an applied electric field across the grating wherein increasing voltage of the field, such as a negative voltage, causes an increase in the refractive index only in the UV exposed regions forming the grating, shifting the grating reflectivity to longer wavelengths (T. Fujiwara et al. in the paper entitled, "UT-Excited Poling and Electrically Tunable Bragg Gratings in a Germanosilicate Fiber", Postdeadline Paper, pp. PD6-1 to PD6-5, *Optical Fiber Conference '95*, (February, 1995). The resulting effect is that the wavelength, $\lambda_2$, can be adjusted to extend the range of possible mid-IR wavelengths generated by NFM device 164.

In of the foregoing embodiments, it should be clear that two factors are of importance in providing for efficient mid-IR frequency conversion. The first factor is that the pump and/or injection mid-IR wavelengths must be of high power in order to take advantage of the efficiency of operation of the NFM device. Otherwise, without sufficient input power provided to the NFM device, the frequency conversion will not be effectively carried out. The second factor is that of tunability of the input power is important in order to extend the possible range of mid-IR frequency conversion. Such tunable devices can be situated in various pump, injection, amplifying, or wave shifting devices employed to provide the input for the NFM device.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that are within the spirit and scope of the following claims.

What is claimed is:

1. A frequency conversion system comprising:
   a first gain source for providing a first frequency output;
   a second gain source for providing a second frequency output;
   means to tune at least one of said gain sources to a frequency within a range of tunable frequencies;
   means for optically combining said first and second frequency outputs; and
   a nonlinear frequency mixing device comprising a QPM nonlinear crystal coupled to receive said first and second combined outputs as an input, said nonlinear frequency mixing device further comprising a plurality of selectable quasi-phase matching poling periods which are selectable in the form of adjacent rows in said nonlinear frequency mixing device aligned in an axial direction of said combined input and means to laterally translate said nonlinear frequency mixing device relative to said combined input to select one of said quasi-phase matching poling periods.

2. The frequency conversion system of claim 1 wherein said mid-IR wavelength range is from about 2 $\mu$m to about 5 $\mu$m.

3. The frequency conversion system of claim 1 wherein said nonlinear frequency mixing device provides either difference frequency mixing (DFM) or optical parametric oscillation (OPO).

4. The frequency conversion system of claim 1 wherein said nonlinear frequency mixing device is a nonlinear crystal device selected from the group of materials consisting of $LiTaO_3$, $LiNbO_3$, KTP, $AgGaS_2$ and $AgGaSe_2$.

5. The pumped mid-IR wavelength source of claim 1 wherein said poling period is varied by lateral translation of said nonlinear frequency mixing device in a direction perpendicular to a propagation direction of said output beam.

6. A pumped mid-IR wavelength source comprising
   a first high power source that is tunable over a near-IR wavelength range and providing an output beam of a first near-IR wavelength;
   a second high power source for providing an output beam of a second near-IR wavelength, a nonlinear frequency mixing device coupled to receive as an input said first and second output beams and produce an output beam having a wavelength in the mid-IR range;
   said nonlinear frequency mixing device having a poling period which can be selectively varied to provide for an extended tunable range of said mid-TR wavelengths, said selective variation selected from the group consisting of a laterally shiftable, fan-shaped poling period, a laterally stepped rows of poling periods and a rotatable poling period for varying the poling period relative to the output beam provided as an input into said device.

7. The pumped mid-TR wavelength source of claim 6 wherein said nonlinear frequency mixing device is a rotatable poling period and is rotated about a central axis thereof.

8. The pumped mid-IR wavelength source of claim 6 wherein said nonlinear frequency mixing device is a rotatable poling period and is rotated about an axis offset from a central axis thereof.

* * * * *